United States Patent [19]

Toyota et al.

[11] Patent Number: 5,487,624

[45] Date of Patent: Jan. 30, 1996

[54] POWDER FEEDING APPARATUS, ELECTROSTATIC POWDER COATING APPARATUS AND POWDER FLOW-RATE MEASURING APPARATUS

[75] Inventors: Hiromichi Toyota; Masao Iwanaga, both of Tokyo, Japan

[73] Assignee: I.T.M. Corporation, Tokyo, Japan

[21] Appl. No.: 198,764

[22] Filed: Feb. 18, 1994

[51] Int. Cl.$^6$ .................................................. B65G 51/16
[52] U.S. Cl. ............................... 406/14; 406/31; 406/152
[58] Field of Search ............................... 406/10, 14, 197, 406/15, 30

[56] References Cited

U.S. PATENT DOCUMENTS

| | | | |
|---|---|---|---|
| 4,480,947 | 11/1984 | Nagasaka | 406/14 |
| 4,743,143 | 5/1988 | Nagasaka | 406/14 |
| 4,747,731 | 5/1988 | Nagasaka et al. | 406/14 |

Primary Examiner—Stephen Avila
Attorney, Agent, or Firm—Price, Heneveld, Cooper, DeWitt & Litton

[57] ABSTRACT

A powder feeding apparatus which has a substantially simplified structure compared to conventional powder feeding apparatuses and which can be easily installed, without requiring any substantial adjustment work. The powder feeding apparatus includes a powder flow rate measuring capillary, the inlet of which is connected to a powder introducing device and to a sensor nozzle for a powder flow rate detection gas provided with a flow control device. A pressure difference detecting device whose interior volume is invariant during normal operation is connected between the inlet and the outlet of the capillary. Further, a pressure difference adjusting device and a large-diameter feeding duct are connected together.

52 Claims, 21 Drawing Sheets

POWDER FEED AMOUNT (g/min)

POWDER FEED AMOUNT (g/min)

POWDER FEEDING APPARATUS, ELECTROSTATIC POWDER COATING APPARATUS AND POWDER FLOW-RATE MEASURING APPARATUS

BACKGROUND OF THE INVENTION

This invention relates to a powder feeding apparatus for conveying powder through a duct by means of a gas, a high-performance electrostatic powder coating apparatus obtained through application of this powder feeding apparatus, and an improved powder flow-rate measuring apparatus for use in these apparatuses.

FIGS. 20 and 22 show a conventionally known automatic control system for feeding powder by means of a gas. This system is used to correctly supply a relatively small amount, e.g., several tens to several hundred grams per minute, of an expensive powder material, to each of several to several tens of apparatuses, as in the case of powder supply to powder coating apparatuses, thermal spraying apparatuses or the like.

Referring to FIG. 20, the length and diameter of a measurement duct 101 and the diameter of a nozzle 103n provided at the inlet of the measurement duct 101, are determined in such a way that a negative pressure which is generated by an injector effect due to a combination of the nozzle 103n and the measurement duct 101 when a measurement gas 118, whose flow rate is maintained at a fixed value by a flow-rate control means 102, is blown into the measurement duct 101 through the nozzle 103n, and a positive pressure generated by the gas measurement gas 118 when it flows through the measurement duct 101, are substantially nullified by cancelling each other. By thus determining the length and diameter of the measurement duct 101 and the diameter of the nozzle 103n, it is always possible to maintain the pressure difference between the inlet 104 and the outlet 105 of the measurement duct 101 at a fixed value of not more than several mm Hg when the velocity of the measurement gas 118 flowing through the measurement duct 101 is approximately in the range of 5 to 30 m/sec.

Under these conditions, when a fluidization gas 116 is dispersed, as indicated by arrows 117, through a porous plate 115 at the bottom of a powder tank 113, powder in the tank 113 is fluidized and introduced to the inlet 104 of the measurement duct 101. Then, the powder is accelerated by the measurement gas as it flows through the measurement duct 101, thereby generating a pressure difference in proportion to the mass flow rate of the introduced powder between the inlet 104 and the outlet 105. Conversely, by measuring this pressure difference, it is possible to measure the flow rate of the powder passing through the measurement duct 101.

In FIG. 20, the pressure at the inlet 104 is introduced to a high-pressure chamber 126 of a differential pressure gauge 106 through a capillary 107 and a connecting tube 122, whereas the pressure at the outlet 105 is introduced to a low-pressure chamber 125 of the differential pressure gauge 106 through a capillary 108 and a connecting tube 120. The differential pressure gauge 106 includes a pressure plate 123, which is supported by a flexible ring 124 constituting the partition of this differential pressure gauge. The pressure difference between the two chambers of the differential pressure gauge 106 acts on the pressure plate 123 to cause a displacement thereof, which displacement is converted into a differential pressure signal 128 in the form of a pneumatic signal, electric signal or the like by a conversion mechanism 127, and is conveyed through a signal processing device 129 which performs signal processing, such as amplification, as needed. The signal is then input to a control device 131.

The control device 131 compares a set value 132 with the input signal, indicated at 130 (i.e., the output from the signal processing device 129), and amplifies the difference thereby obtained. The output of the control device 131, indicated at 133, is used to operate a control valve 134 so as to control the flow rate of compressed gas 136, which is introduced to a nozzle 137 of an injector 139, which consists of the nozzle 137 and a throat 138, through a pipe 135. The flow rate of the compressed gas 136 is controlled so as to adjust the negative pressure at the measurement duct outlet 105, which constitutes the vacuum chamber of the injector 139, in such a way that the pressure difference between the inlet 104 and the outlet 105 of the measurement duct 101, that is, the mass flow rate of the powder, is constantly matched with the set value 132 of the control device 131, thereby constantly maintaining the mass flow rate of the powder in a gas/powder two-phase flow 141, supplied through a feeding duct 140, at a predetermined value.

If the flow rate of the gas supplied through the nozzle 137 is not high enough, the velocity of the gas flowing through the feeding duct 140 is rather low, resulting in pulsations being generated in the powder feed. Such pulsations can be prevented by providing the injector outlet with a gas inlet 149 for an auxiliary carrier gas 150 so that the proper feeding rate can be ensured.

In order that the gas pressures at the inlet 104 and the outlet 105 of the measurement duct 101 may be detected and communicated without involving a reverse flow of the powder, fixed amounts of purge gases 110 and 112, whose flow rates are correctly controlled by flow rate control means 109 and 111, respectively, are introduced into the capillaries 107 and 108 through tubes 121 and 119, respectively, in such a way that the gas flow velocities in the capillaries 107 and 108 are maintained at fixed values of not less than 15 m/sec.

A working curve of this apparatus is obtained in the following manner: an air permeable sack for collecting powder is fitted onto the outlet end section of the feeding duct 140 in order to measure the amount of powder fed in a fixed period of time. From this measured value, the amount of powder fed per unit time is calculated. By performing calculations in this way, a first working curve 153 as shown in FIG. 23 is obtained with respect to this particular system. In FIG. 23, the x-axis indicates the amount of powder fed per unit time, and the y-axis indicates differential gauge output as displayed on a display device 130i.

The first working curve 153 obtained in this way is generally hard to use as it is, since it involves variations in intercept and inclination due to various factors, such as the machining precision for the system components 101, 103n, 107, 108, 119, 120, 121, 122, 106, etc., the conditions for the assembly of the components, the installation and piping of the system, and the physical properties of the powder. In particular, such variations constitute a problem when a plurality of powder feeding apparatuses are operated in parallel since that requires the respective working curves of the different systems to be equalized.

It should be noted in this regard that the purge gas 110 is capable of shifting the working curve in the positive direction along the y-axis through a pressure drop in the capillary 107, that the purge gas 112 is capable of shifting the working curve in the negative direction along the y-axis through a pressure drop in the capillary 108, and that the measurement gas 118 is in a positive relation mainly to the inclination of the working curve. Thus, by adjusting the respective flow rates of these gases, the working curve can be modified. For example, by increasing the purge gas 110 by an empirically known amount, it is possible to modify the first working curve 153 of FIG. 23 in such a way that its intercept is shifted to zero, as in the case of a working curve 154 shown in FIG. 24.

Further, by increasing the measurement gas 118 by an empirically known amount, the inclination of the working curve can be enhanced as in a working curve 155 shown in FIG. 24. In this way, it is possible to adjust the working curve to a predetermined inclination, which, in the case of FIG. 24, is one at which the differential pressure gauge output is 200 mmAg when the amount of powder fed per unit time is 200 g/min.

In these adjustments, the points in the small circles in FIGS. 23 and 24 cannot be located without performing the collection and measurement of powder at least two times for each of these points, which means a considerable amount of time and labor is required for these adjustments.

In the case of a powder coating apparatus or the like, an intermittent supply of powder is required. For this purpose, a powder valve 148 is provided, which, as shown in FIG. 20, consists of a pinch rubber member 143 fitted into the interior of a housing 142 provided between the measurement duct outlet 105 and the injector 139.

The opening and closing of the powder valve 148 is effected, for example, in the following manner: pressure as indicated by an arrow 147 is applied to the outer periphery of the pinch rubber member 143 by a three-way valve 146 through a pipe 145. This causes an inward deformation of the pinch rubber member 143, which is then brought to a condition as indicated at 143' in FIG. 21. As a result, the communication between the injector 139 and the measurement duct outlet 105 is disconnected, thereby stopping the powder supply.

At this time, the injector 139 is usually also stopped by stopping the supply of the compressed gas 136 for driving the injector, by means of an electromagnetic valve or the like (not shown). In this process, the purge gases 110 and 112 and the measurement gas 118 are generally allowed to continue to flow so that a reverse flow or intrusion of powder is prevented. In this condition, the powder is caused to flow back to the powder tank 113.

When re-starting the powder supply, the pinch rubber member 143 is released from the above-mentioned pressure by the three-way valve 146 to restore it to the former condition as indicated at 143 by virtue of its elasticity, etc. At the same time, the supply of the compressed gas 136 for driving the injector is started.

FIG. 22 shows the essential part of another means for preventing powder from entering the ducts for communicating the pressures at the inlet 104 and the outlet 105 of the measurement duct 101 to the differential pressure gauge 106. Apart from this essential part, the structure of this means is the same as that shown in FIG. 21. In the case of the structure shown in FIG. 22, the pressures at the inlet 104 and the outlet 105 are respectively transmitted to the differential pressure gauge 106 through porous plates 151 and 152, the capillaries 107 and 108, and the connecting tubes 120 and 122. In this structure, it is necessary to provide purge gases 110 and 112 for the purpose of preventing changes in gas-flow resistance due to clogging of the porous plates and appropriately adjusting the intercept of the working curve.

Regarding the means for detecting the pressure at the inlet 104 of the measurement duct, it is also possible to prevent intrusion of powder by opening the capillary 107 at a position which is near the outlet of the nozzle 103n and in the upstream thereof, or to arrange the capillary 107 and the porous plate 151 at other positions which are at the same level as the inlet 104 of the duct for measuring the fluidized powder in the tank.

Apart from the conventional techniques described above, various other means are in use. For example, a powder feeding means is available, in which the powder in the feeding tank is adjusted in various ways so that the filling factor of the powder is kept from being influenced by the powder level in the feeding tank so as to hold the filling factor constant and, in this condition, the powder is extracted by extracting means, such as pore-row raking-out means, groove raking-out means, or drawing means using a precision screw feeder, before the conveying means using a gas is applied.

The operation of these means, however, have to be stopped from time to time so as to perform actual quantity measurement. Generally speaking, under the existing circumstances, it can be said that a means for measuring and controlling powder mass flow has not been known yet which operates accurately, which is inexpensive, which has a simple structure, whose interior can be easily cleaned, which excels in stability for long-term use, and which can be used in combination with a gas carrying system.

Apart from the above, a "loss-in-weight" system is known, according to which the weight of the powder hopper and that of the extraction means are constantly measured in their entirety; the results are differentiated to calculate a value corresponding to the instant feeding amount; and the extraction means is automatically controlled in such a way that the above value is kept at a fixed value. This system, however, has a problem in that separation of the hopper has to be effected for each of the extraction means, each extraction means requiring a measuring device to which powder must be supplied, resulting in the entire apparatus becoming very complicated and expensive. Thus, the range of applications for this system is very limited.

In the above-described conventional automatic control systems (hereinafter referred to as the "prior-art techniques", shown in FIGS. 21, 22, 23 and 24, the interior of the measurement duct 101 is usually made of a non-adhesive resin, such as fluororesin or high-density polyethylene. Despite such a material, some powder may be deposited on the inner surface of the measurement duct, depending upon the properties of the powder and those of the measurement gas, with the result that the configuration of the inner surface of the duct is changed, thereby making it impossible to accurately measure.

There is constantly a gas flow of 15 to 20 m/sec or more in each of the capillaries 107 and 108 for detecting and communicating the pressure difference generated between the inlet 104 and the outlet 105 of the measurement duct 101 in proportion to the powder flow rate. Despite this gas flow, some electrically charged powder can flow up into the capillaries 107 and 108 due to the pressure fluctuations inevitably generated in the gas flow or the gas/powder two-phase flow in the measurement duct or some other place, or due to the variations or fluctuations in pressure caused by the repeated operations of the pinch rubber member. The powder flowing up into the capillaries 107 and 108 will stick to the inner surfaces of these capillaries to cause the flow resistance thereof to change and, further, flow up into the tubes 119 and 121 and the connecting tubes 120 and 122, sticking to the inner surfaces thereof. Clumps of this sticking powder may be separated by mechanical shock or the like and thereafter clog the capillaries 107 and 108. To prevent this, these tubes 107, 108, 119, 121, 122, etc. have to be periodically cleaned, which requires a considerable amount of cost and labor.

The generation of errors and malfunctions caused by powder flowing up into these tubes due to pressure fluctuations, etc. is more liable to occur in proportion to the interior volumes of the high-pressure-side tubes 121 and 122, the interior volume of the high-pressure-side chamber 126 of the differential pressure gauge, the interior volumes of the low-pressure-side tubes 119 and 120, the interior volume of the low-pressure-side chamber 125 of the differential pressure gauge, and the degree of displacement of the pressure plate 123 and the partition 124 of the differential pressure gauge. Further, the powder flowing up into these tubes may enter the differential pressure gauge, causing malfunctions thereof.

In the structure shown in FIG. 22, in which differential pressure is communicated through the porous plates 151 and 152, instead of the capillaries 107 and 108, in order to avoid reverse flow of powder, the purge gases flowing through these porous plates cause clogging with the passage of time due to a minute reverse flow caused by pressure fluctuations even though the purge gases flow generally in the directions indicated by arrows 110 and 112. As a result, the pressure drop in the porous plates gradually increases, thereby making it impossible to prevent generation of large errors.

This is attributable to the compression of the gas upstream of the porous plates, fluctuations in volume, and deformation of the piping, and is, consequently, inevitable. The above condition is also due to adhesion and solidification of electrically charged powder on the porous plates. It is impossible to avoid such phenomenons even by using porous plates of finer mesh. On the contrary, use of such porous plates of finer mesh would lead to an increase in the pressure drop of the purge gases 110 and 112 as they pass through the porous plates 151 and 152, which pressure drop, together with the clogging caused by a trace quantity of particles inevitably contained in the purge gases 110 and 112, would cause malfunction of the differential pressure detection system.

The four tubes 119, 120, 121 and 122 used for the measurement of differential pressure in the conventional example shown in FIGS. 21 and 22, are rather numerous, so that they will be obstructive during field work, such as during the change of colors of powder coating materials. These numerous tubes will also lead to a considerable cost for the piping. Further, the flow rate control means 109 and 111 require combined use of an automatic constant-pressure valve, an infinitesimal-flow-rate regulating valve, an infinitesimal-flow meter, etc, resulting in an expensive system. Moreover, the installation and adjustment of the system must be conducted scrupulously, resulting in a lot of time being required.

Further, to conduct field work, such as color change, the piping of the system should not be made of inflexible materials such as metal or hard plastic; it is necessary to employ piping consisting of flexible hoses, with the result that the length, configuration, etc. of the piping and the characteristics of the differential pressure detection system differ from unit to unit. This also leads to bothersome installation and adjustment operations.

In the example shown in FIGS. 21 and 22, the purge gases 110 and 112 are eventually united with the powder carrier gas and thereby increase the feeding rate. As a result, the performance of the injector 139 is impaired, and the amount of the compressed gas 136 is increased. This is particularly undesirable when the total amount of carrier gas has to be as small as possible to maintain a gentle discharge pattern at the piping end, as is often the case with electrostatic powder coating.

Further, the purge gas 110 on the upstream side has an influence on the acceleration of the powder in the measurement duct 101, so that, however precise the dimensions of the measurement duct 101 may be, it is not possible to constantly maintain the differential-pressure-generation characteristics, which depend upon acceleration, with the result that the inclinations and intercepts of the working curves shown in FIGS. 23 and 24 interfere with each other. Thus, a lot of time and expense is required for adjustments and measurements, resulting in high costs.

Further, even when no powder is being supplied, the purge gases 110 and 112 and the measurement gas 118 must continue to flow, resulting in an increase in cost, scattering of powder, shifts in grain size distribution, etc, which should not be overlooked.

In the conventional techniques described with reference to FIGS. 21, 22, etc., the fluctuations in the powder feed amount in the case, for example, of a powder coating apparatus, are mainly attributable to the following four factors: a fluctuation in the level of the coating material contained in the tank 113; a reduction of the inner diameter of the feeding duct 140 due to adhesion of powder to the inner surface thereof; a degeneration in performance due to wear of the injector throat 138; and a change in the gun level when coating a long and large object which is vertically suspended. The amount of the compressed gas 136 increases or decreases according to the above four factors, making it possible to automatically adjust the powder feed amount to a predetermined value.

The change in feeding rate caused in this process is usually approximately 5 to 15%, which may be acceptable for practical uses. However, there is an increasing demand for an expansion of the range of applications of powder coating and for a more exact quality control regarding film thickness and coating efficiency. From this viewpoint, the fluctuations in the amount of the compressed gas 136 due to the automatic control of the powder feed amount, and the fluctuations in powder discharge rate and in the pattern caused by the fluctuations cannot be neglected.

If the powder sticking to the inner surface of the duct has grown to an excessive degree, the operation of the apparatus is temporarily stopped, and the pinch valve 148 is closed. Then a large amount of gas is blown into the duct 140 through the injector nozzle 137 and the gas inlet 149 by some other means (not shown) in order to remove the powder from the inner surfaces of the feeding duct 140. After that, normal operation can be started again. Thus, the operation has to be interrupted to clean the duct. Further, since the sticking powder cannot be completely removed from the inner surface of the feeding duct 140 even by the above blowing operation, with the result that the powder feeding rate inevitably increases, though gradually. Thus, after the elapse of a fixed length of time, the feeding duct 140 has to be replaced by a new one.

In the above prior-art technique, the essential structure of which is shown in FIGS. 21 and 22, the powder tank, from which powder is introduced to the measurement duct 101, may contain a powder portion which is hard to fluidize. In order to fluidize such a powder portion, the tank itself or a porous plate provided therein is vibrated by some auxiliary means. In some cases, however, the fluidization cannot be effected even by vibrating the entire tank, making it impossible for the powder to be smoothly fed. Though vibrating the above-mentioned porous plate mostly proves effective, it has a problem in that the service life of the porous plate is shortened.

When a single tank is used with a number of powder feeding apparatuses operated in parallel, the tank must be large. The fluidization plate must be large as well. To operate such a large tank and large fluidization plate, a great quantity of fluidization air has to be consumed, resulting in a large cost.

When powder feeding is conducted by using a small amount of carrier gas, it is advantageous to extract powder from the bottom of the tank, as shown in FIG. 20. However, when cleaning the interior of the powder feeding system, it takes a long time to detach the system from the tank. Further, if it is detached after stopping the fluidization, some powder inevitably spills, thereby contaminating the environment.

Further, when applied to powder coating, the above system entails the following problem: when blowing is used to remove powder sticking to the inner surface of the feeding duct or to effect color change, powder is ejected at high speed from the tip of the gun, thereby contaminating the inner walls of the booth. It takes time and labor to clean the booth. It also takes time to clean the feeding duct portion which is inside the booth and to remove powder sticking to the exterior of the gun, closing the system down for a considerably long time for cleaning, color change, etc.

The measurement duct 101 and the injector throat 138 are usually made of a non-adhesive fluororesin or a high-density polyethylene. Despite using such materials, some powder may solidify in the interior of these components, thereby impairing the system functions. In the above prior-art technique, it is impossible to cope with such a situation when powder is to be fed with a very small amount of carrier gas and, in particular, when the measurement and feeding of powder is to be conducted with the powder flow-rate detection gas only.

SUMMARY OF THE INVENTION

The present invention has been made with a view toward solving the above problems in the prior-art techniques, schematically shown in FIGS. 21, 22, 23 and 24. In a first aspect of the present invention, a fixed amount of carrier gas from a carrier gas supply means is diverted by a flow rate control means and is caused to flow out through a sensor nozzle as a powder flow rate detection gas. An inlet of a measurement capillary having a diameter smaller than that of the feeding duct, usually ½ thereof or less, is provided on the downstream side of and in close proximity to the sensor nozzle. The powder flow rate detection gas is blown into this inlet so as to introduce powder into the measurement capillary, accelerating it by the powder flow rate detection gas. This causes a pressure difference to be generated between the inlet and outlet of the measurement capillary in proportion to the mass of the powder introduced into the measurement capillary. This pressure difference is communicated through a filter means and a stationary duct having a small interior volume which is fixed during normal operation, to be measured by an electronic differential pressure detecting device which is composed of high-pressure and low-pressure chambers having small interior volumes, a substantially rigid partition, and a housing. The filter, the stationary duct, and the high-pressure and low-pressure chambers form a blind tubular route during steady operation.

The above arrangement enables the entire differential pressure measurement system for converting the powder flow rate into an electric signal to be markedly reduced in size, and diminishes the variations in characteristics of the differential pressure measurement system to a negligible degree. As a result, even in a large powder coating system, which requires a parallel operation of a large number of powder feeding systems, color change in multi-color coating, etc., there is hardly any need to perform calibration to equalize the characteristics of the differential pressure measurement systems, thereby markedly simplifying the installation and adjustment operations.

Various materials may be used for the filter means mentioned above in accordance with the physical properties of the powder, in particular, the particle size distribution thereof. From the viewpoint of general versatility, it is desirable to employ a continuous film material like a non-adhesive fluororesin having a porous texture whose pore diameter is smaller than the grain size of the finest powder used in the apparatus.

Due to the above arrangement, together with the very small and non-changing interior volumes of the ducts and of the differential pressure detecting device, which are connected on the downstream side of the filter means, powder is prevented from intruding through the filter means; it is only deposited on the exterior of the filter means in the form of a thin layer. Since pressure is always transmitted easily through this powder layer, fluctuations in the characteristics of the apparatus are prevented, thereby always making it possible to accurately perform differential pressure measurement and substantially eliminating maintenance work.

In particular, when the powder is liable to be electrically charged, it is possible to prevent adhesion of powder to the filter means by forming the filter means of a conductive material. Back washing is applicable as needed.

Through application of the various means of the present invention described above, a very simple apparatus structure can be realized. Since no portion of the apparatus is vulnerable to intrusion and deposition of powder, the interior of the apparatus can be easily cleaned by a blowing operation or the like without having to dissemble the apparatus. This is expedient in effecting color change.

An apparatus constructed as described above can be adjusted far more easily and reliably by signal processing operations, for example, modification of the inclination, intercepts, etc. of the working curve, than by regulating the characteristics of the entire differential pressure measurement system through the control of the flow rate and pressure of the gases, the duct properties, etc., as in the prior art. In view of this, the present invention employs an adjustment method based on signal processing.

Since there is a very satisfactory linear relationship between the mass flow rate of the powder and the corresponding differential pressure signal generated therewith, such signal processing operations can be effected very easily, constituting an important feature of the present invention.

In a second aspect of the present invention, the problems in the prior art are solved by forming the interior of the powder feeding duct of a non-adhesive material like fluororesin in order that the fluctuations in the flow rate of the powder carrier gas may be mitigated as much as possible. More preferably, the material employed is one having conductivity.

This arrangement facilitates a substantial reduction of the adhesion of powder to the inner surface of the feeding duct and, consequently, makes it possible to considerably mitigate the fluctuations in the amount of carrier gas caused by the control effected for keeping the powder flow rate constant. When applied to electrostatic powder coating, the use of such materials as mentioned above helps to improve the stability of the discharge pattern of the powder coating material ejected from the gun. At the same time, this helps to attain an improvement in coating efficiency, uniformness in coating film thickness, etc. It also proves effective for color change in the piping.

In some rare cases, powder adhesion occurs in the interior of the measurement duct, the injector throat, etc., which are usually made of a non-adhesive fluororesin or high-density polyethylene. Such powder adhesion can be mostly avoided by forming these components of a conductive material.

When a further stabilization in feeding rate is required, fixed command control is applied to the total amount of gas eventually used for the powder feeding, that is, to the carrier gas supply means. A part of the gas is conveyed through a flow rate control means so as to be used as a powder flow rate detection gas in a fixed amount. The rest is branched off to be divided into two portions. A control valve is provided in the pipe for one of the two portions, and controlled by the output of the powder flow rate control device in such a way that the pressure difference between the inlet and outlet of the measurement capillary is kept constant. On the other hand, a fluid resistance is provided in the pipe for the other portion, and is arranged to open at the upstream end of the feeding duct. Since the total amount of gas in these two pipes is under fixed command control that is effected on the upstream side thereof, the gas flow rate in the pipe having the control valve varies conversely to the variation in the flow rate in the pipe having the fluid resistance, i.e., increases or decreases as the flow rate in the pipe having the fluid resistance decreases or increases, so that the total flow rate is always kept at a constant value, thereby accurately maintaining both the feeding amount and the feeding rate of the powder at predetermined values.

The means for keeping the total amount of gas used for the powder feeding constant is not restricted to the embodiment described above. Other appropriate means are also applicable according to the purpose and conditions.

Also in this case, the interior of the powder feeding duct is formed of a non-adhesive material like fluororesin. More preferably, the material employed is a conductive one, and a grounding means is preferably provided as needed.

Thus, when applied to an electrostatic powder coating apparatus, the above arrangement always enables both the powder discharge amount and the powder discharge pattern of the gun to be correctly kept constant, thereby providing various remarkable advantages. For example, a reduction in coating material is achieved, the coating layer thickness distribution is uniformalized, the coating efficiency is improved and stabilized, the duct color change is facilitated, the maintenance/inspection cost is reduced, the effective operating time is improved, etc.

In a third aspect of the present invention, the problems in the prior art are solved by making the tank easily detachable with respect to a series of components according to the present invention, which series of components consist of: a powder introducing section→a capillary for powder flow rate detection→an injector→a feeding duct, faciliatating the color change and cleaning operations are facilitated. Roughly speaking, this can be achieved by the following two methods:

According to one method, which is applicable when extracting coating material from the side wall of the tank, a valve means, such as a pinch valve belonging to the tank, is provided between the tank and the series of components mentioned above. Due to this arrangement, when cleaning, color change, etc. is to be performed, the series of components can be detached from the tank after closing the valve means.

According to the other method, the above-mentioned series of components are constructed as a vertical shaft, which is inserted from above into the powder contained in the tank, and, in this condition, the system is operated. When effecting cleaning or color change, this shaft is drawn upwards to be separated from the tank.

The above methods make it possible to prevent powder from contaminating the environment during the operations of color change, cleaning, etc. Further, the methods enable these operations to be executed easily and quickly.

A fourth aspect of the present invention for solving the problems in the prior art is related to an improvement of the powder tank. For the purpose, the following two measures are taken: (1) Partial fluidization, vibration powder feed, etc are executed as a means for enabling powder to move smoothly in the vicinity of the powder inlet for introducing powder into the measurement duct.

(2) A partition is provided inside the tank in order that the powder in the tank may always be smoothly fed to the section near the powder inlet and that the porous plate for fluidization, which is provided at the bottom of the tank, may operate effectively. The tank may be made of a flexible material and oscillated with an appropriate cycle. Further, it is also possible to adopt an arrangement in which a small porous plate for fluidization is provided at the bottom of a tank which is made of a flexible material. This porous plate is caused to vibrate from the outside, with the powder inlet being arranged in the vicinity thereof. Due to these arrangements, it is possible to achieve a reduction in the cost for the manufacture and handling of the tank, and to realize a more smooth operation.

In a fifth aspect of the present invention for solving the above problems in the prior art, there is provided, as a means for cleaning the exterior of the end sections of the powder supply system, i.e., the end sections of the powder feeding shaft and the feeding duct, and the exterior of the electrostatic powder coating gun, etc. connected to these end sections, a ring-shaped inlet having a diameter slightly larger than those of the objects of cleaning is provided. The above-mentioned inlet and the object of cleaning are moved relative to each other, as needed, so as to remove any powder sticking to the exterior of the object. If the sticking powder is relatively hard to remove, a ring-shaped spray nozzle having a high spraying speed with an amount of gas smaller than the intake capacity is provided in the vicinity of the ring-shaped inlet, thereby providing a powerful cleaning means.

Further, when using this cleaning means, the gun is lodged in a gun-exterior-cleaning cap having a diameter slightly larger than the outer diameter of the gun, a length substantially equal to that of the gun, and a ring-shaped inlet port at the base of the gun, and the piping end of the powder feeding system is separated from the powder tank. In this condition, when air intake is strongly effected through the above-mentioned inlet, a strong intake flow occurs simultaneously in the interior of the powder feeding system and in the exterior of the gun, thereby cleaning the entire system easily in a short time, without contaminating the environment, for example, the inner wall of the powder coating booth with blown powder.

The same effect can be obtained by flowing the cleaning gas in the reverse direction. Further, by blowing in the gas from the other intake end, it is possible to obtain a more enhanced cleaning effect, without contaminating the environment.

In a sixth aspect of the present invention for solving the above problems in the prior art, the requisite pressure difference for obtaining a predetermined powder flow rate in the measurement capillary is generated by a means for introducing powder to the inlet of the measurement capillary, in which there is a gas flow of a predetermined flow rate. Due to this arrangement, it is possible to attain a predetermined powder feed amount with a very small amount of carrier gas. For this purpose, an enclosed tank is used, and a structure is adopted in which a feeding device of a vibration type, screw type, belt type, etc. communicates solely with the tank.

A differential pressure generated in the measurement capillary is measured by a differential pressure measuring device through a filter means and a stationary tube having a small interior volume, and is converted into an electric signal, which is subjected to signal processing, such as correction of inclination and intercepts or smoothing. After that, a powder flow rate control means is applied.

Thus, a remarkable reduction in apparatus size is attained, while always keeping the apparatus characteristics constant and free from the influences of the installation conditions, etc. Thus, the operations of producing, installing, calibrating, adjusting, etc. are markedly simplified, and a reduction in cost is achieved.

As a result of the simplification in structure, the use of a material for preventing powder adhesion in those sections coming into contact with powder, and the improvement in tank, feeding means, etc., the stability of the apparatus in long-term use has been markedly improved, and the amount of maintenance/inspection work has been substantially diminished.

At the same time, this arrangement makes it possible to clean the interior of the apparatus in a short time, without having to disassemble the apparatus. Thus, when applied to powder coating, this arrangement enables change of color to be effected easily in a short time.

In accordance with the present invention, it is not only possible to always keep the powder feeding amount constant, but also to mitigate the fluctuations in the amount of carrier gas to a remarkable degree. If necessary, it is always possible to realize a fixed carrier gas flow rate, so that, when the apparatus is applied to electrostatic powder coating, it is possible to keep the amount of coating material discharged from the gun and the discharge pattern thereof constant. As a result, remarkable advantages can be achieved, including an improvement in coating efficiency, stabilization and uniformalization in coating film thickness, substantial const reduction in coating material, an improvement in product quality, etc.

As a result of improving the tank and the feeding means, it has been made possible to markedly reduce the amount of carrier gas, thereby widening the range of applications for the technique.

DETAILED DESCRIPTION OF THE PREFERRED EMBODIMENTS

Figure 1:
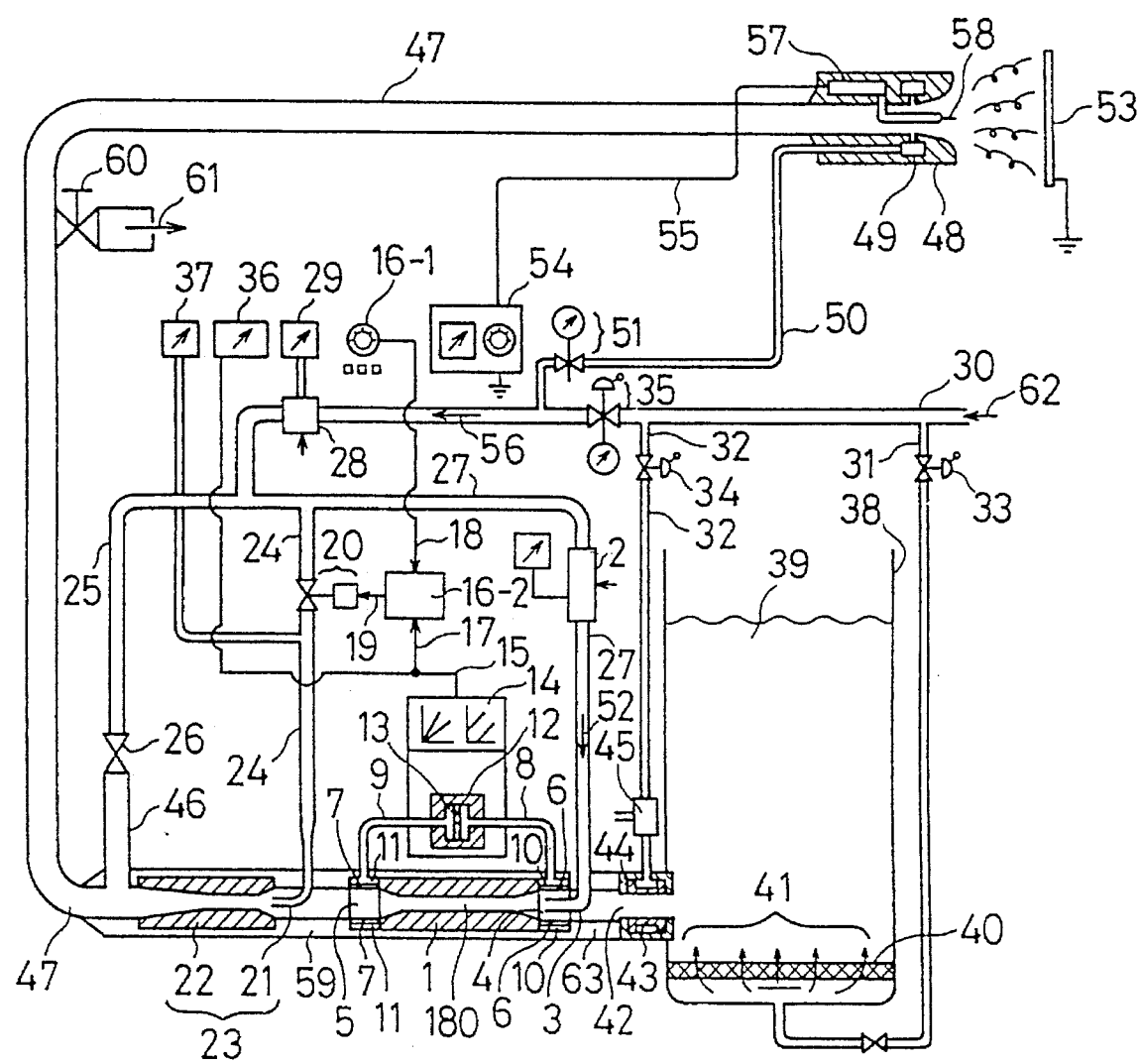
FIG. 1 is an overall schematic view of an electrostatic powder coating apparatus according to the present invention.
Figure 11:
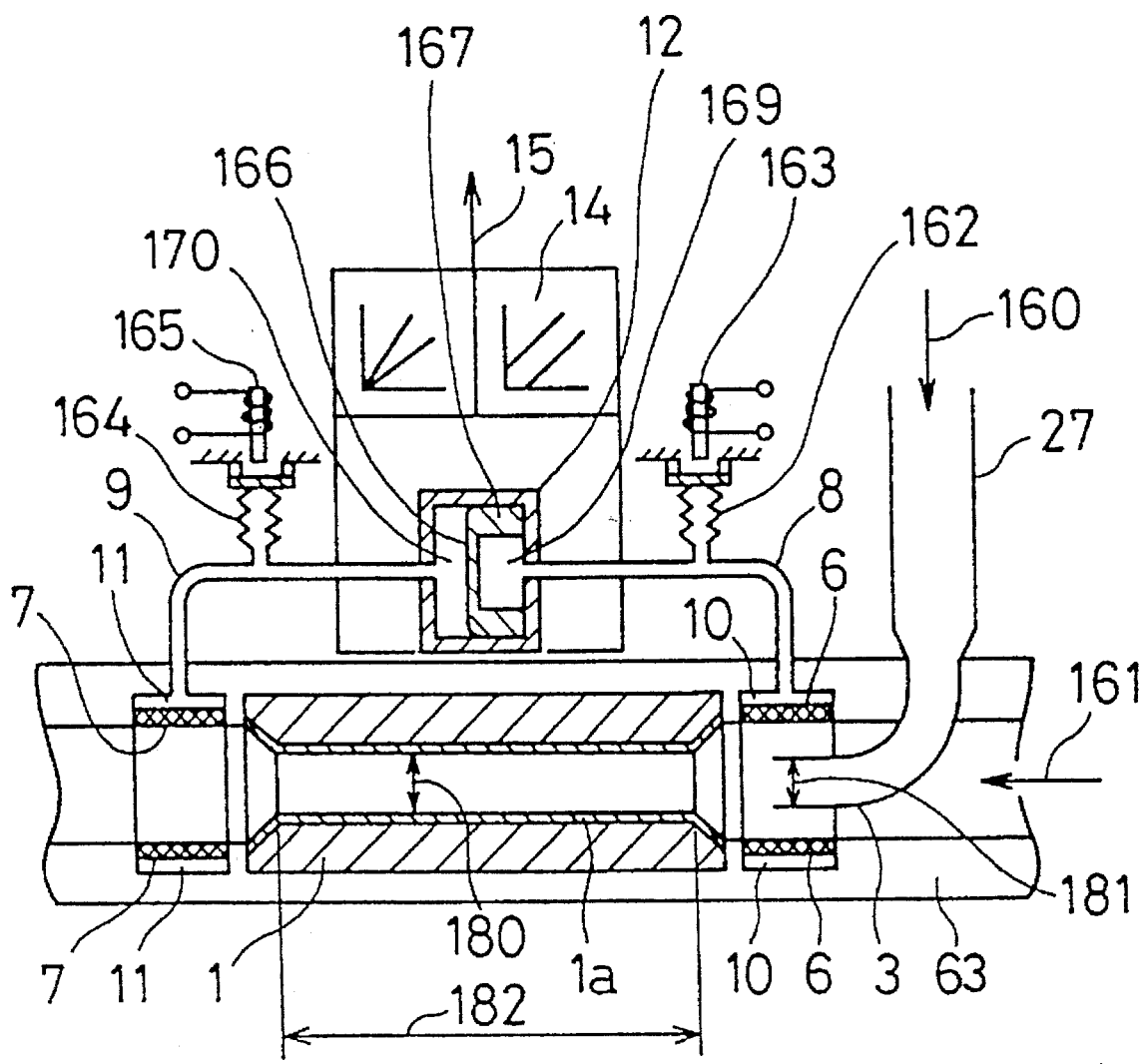
FIG. 11 is a detailed diagram showing the construction of a powder feed amount measuring apparatus according to the present invention.
Figure 12:
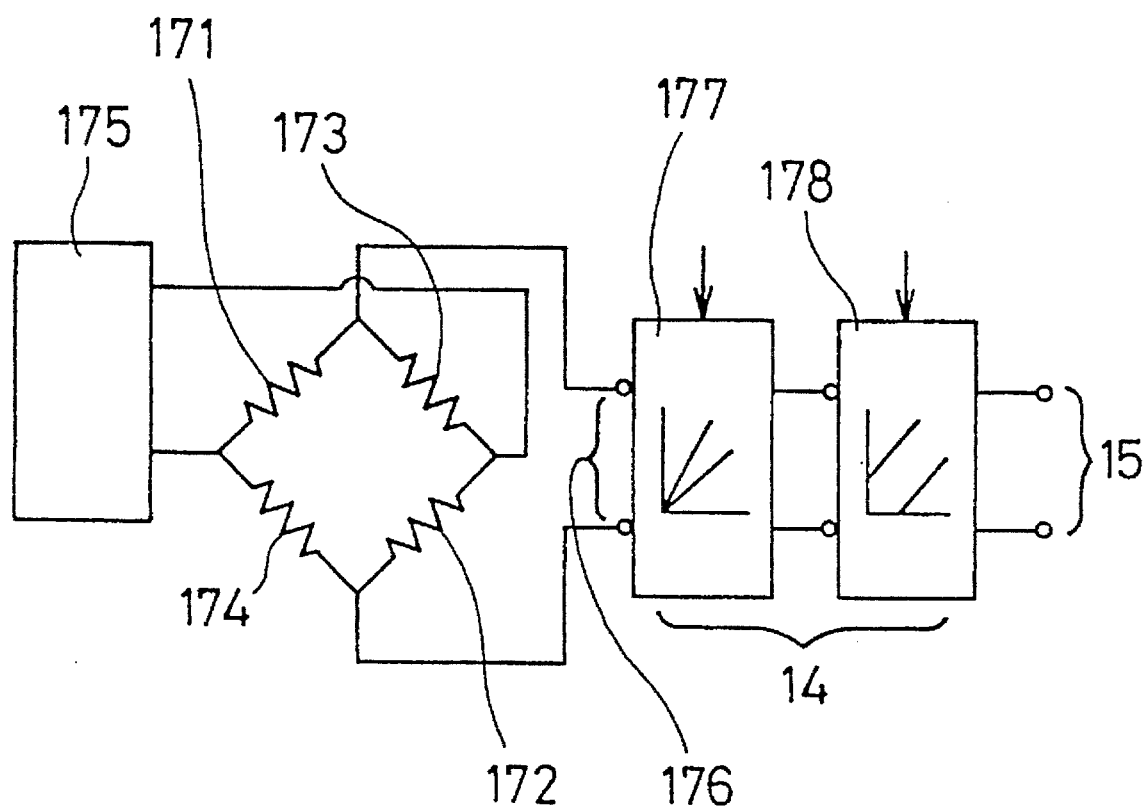
FIG. 12 is a diagram showing the electric circuit configuration of a powder feed amount measuring apparatus according to the present invention.
Figure 13:
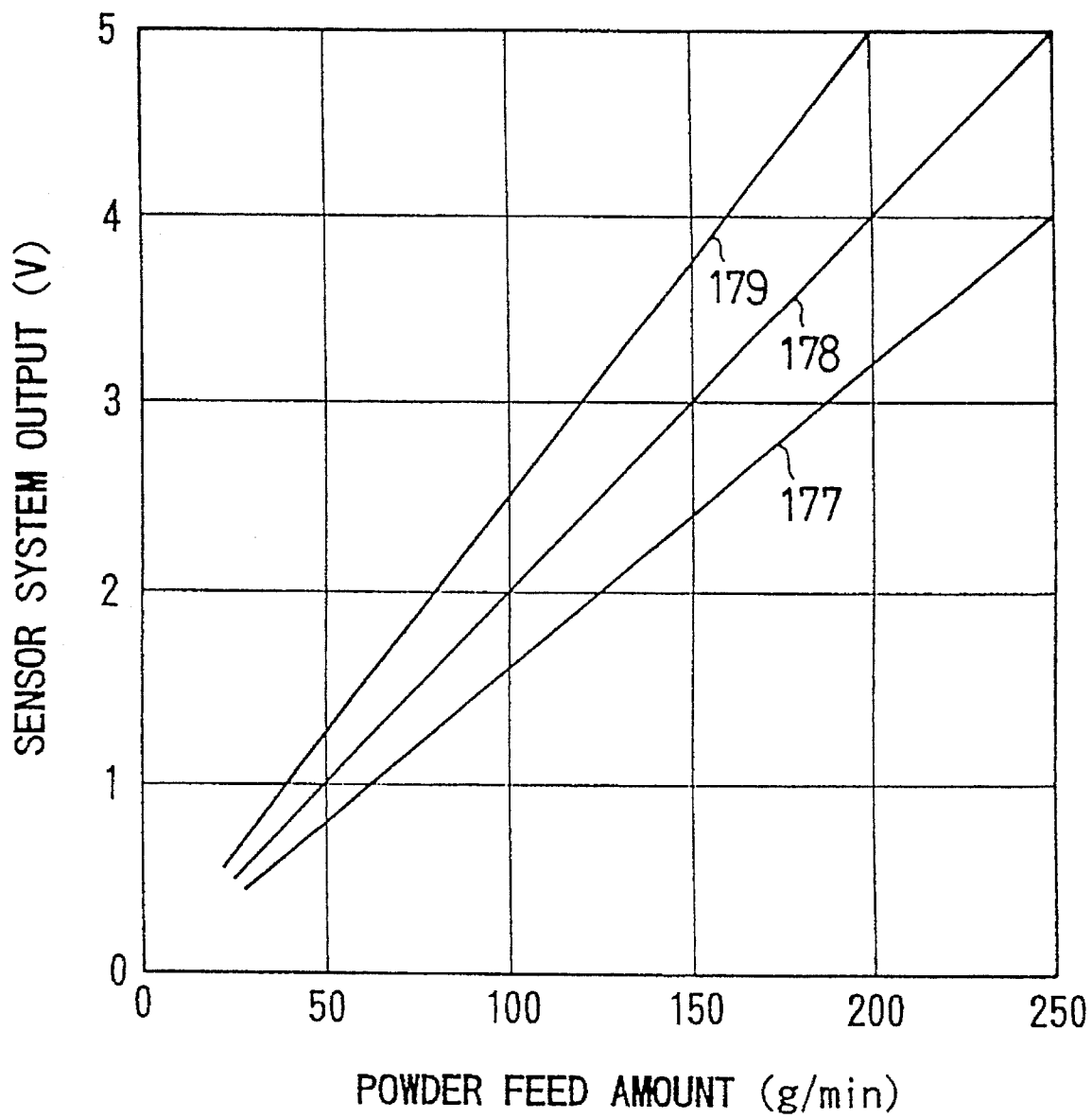
FIG. 13 is a powder-feed-amount/output plot of a powder feed amount measuring apparatus according to the present invention.

FIG. 1 shows an example of a typical construction of a powder feeding apparatus according to the present invention, and a high-performance electrostatic powder coating apparatus based upon it. FIG. 11 shows in detail an example of a powder feed amount measuring apparatus section provided in the apparatus of FIG. 1. FIG. 12 shows an example of a signal conversion/processing circuit of a differential pressure detecting device used in the powder feed amount measuring apparatus section mentioned above. FIG. 13 shows an example of the output characteristics of a powder feed amount detection system.

Referring to these drawings, a measurement capillary 180 is formed along the central axis of a sensor tube 1. A powder flow rate detection gas 52, whose flow rate is controlled to a fixed value by a flow rate control means 2, is blown into the measurement capillary 180 by means of a sensor nozzle 3 which is usually coaxial with this capillary. Powder 39 contained in a tank 38 is fluidized by a fluidization gas blown, as indicated by arrows 41, into the tank 38 through a porous plate 40 at the bottom thereof, and passes through a powder introduction path 42 at a very slow speed before it is introduced to an inlet 4 of the sensor tube 1. In the measurement capillary 180, the powder is accelerated by the powder flow rate detection gas 52 and passes through an outlet 5 of the sensor tube 1. The powder is then driven by an injector 23, which consists of a nozzle 21 and a throat 22, to be conveyed through a large-diameter feeding duct 47 before it is discharged through an electrostatic powder coating gun 48 to be applied to an object to be coated 53.

In this system, constructed as described above, the respective pressures at the inlet 4 and the outlet 5 of the sensor tube 1 are respectively communicated through ring-shaped filters 6 and 7, ring chambers 10 and 11, and a high-pressure duct 8 and a low-pressure duct 9, whose respective configurations are substantially fixed and whose interior volumes are kept constant, to a high-pressure chamber 169 and a low-pressure chamber 170, which have fixed volumes and which are separated from each other by a pressure sensing membrane 13.

It is also possible for the high-pressure duct 8, the low-pressure duct 9 and the electronic differential pressure detecting device to be combined into a detection module, which, as needed, can be detached or replaced as a single unit.

The pressure sensing membrane 13 consists, for example, of a thin silicon membrane, which is supported by a base member 167 shown in FIG. 11. Piezoelectric resistor elements 171 and 172, whose electrical resistances vary in accordance with stresses applied thereto, are provided on one side of the pressure sensing membrane 13, and similar piezoelectric elements 173 and 174 are provided on the other side of the membrane, thereby forming a bridge circuit as shown in FIG. 12. A constant current is supplied to this bridge circuit from a power source 175. An output 176 of this bridge circuit regulates the inclination of an output working curve through a variable amplification setting circuit 177, regulates the intercepts of the output working curve through a variable intercept setting circuit, and effects smoothing as needed. In this way, a very satisfactory linear relationship as shown in FIG. 13 is obtained between the sensor system output 15 and the powder feed amount.

The pressure difference generated between the inlet 4 and the outlet 5 of the sensor tube 1 is based on the sum of the pressure difference generated as a result of the acceleration of the powder in the measurement capillary 180 by the powder flow rate detection gas 52 and of the pressure loss generated by the passing of the powder fed. According to both theory and experiments, it is known that the pressure difference between the inlet and the outlet of the sensor tube 1 is proportional to the production of the mass flow rate and the acceleration flow velocity of the powder. Therefore, by keeping the flow rate, i.e., the flow velocity, of the powder flow rate detection gas 52, which flows through the measurement capillary 180, constant, it is possible to accurately obtain the powder feed amount from the output 15 of the sensor system.

In the examples shown in FIGS. 1, 11, 12 and 13, various materials can be employed for the filters 6 and 7 in accordance with the physical properties of the powder. From the viewpoint of general versatility, it is desirable to use a non-adhesive continuous porous film material like fluororesin, whose porous diameter is smaller than the grain size of the finest powder fed in this apparatus.

When the powder is easily chargeable and, thus liable to adhere to the filters, satisfactory results can be obtained by forming the filter means of a conductive material.

Apart from the piezoresistance system described above, it is also possible for the electronic differential pressure detecting device 12 to adopt a system in which the stress of the pressure sensing membrane is detected as a change in electrostatic capacitance, or a system of some other appropriate type as needed.

It should be particularly noted here that the interior volumes of the high-pressure chamber and the low-pressure chamber of the electronic differential pressure detecting device are very small (which volumes can be easily made 0.5 cc or less) and are substantially free from variation. By combining such small-volume pressure chambers with stationary ducts having small interior volumes, the volume of gas allowed to pass through the filters by the operation and stopping of the system and by fluctuations in differential pressure during the operation, can be made very small, and the integrated value of the amounts of gas passing through the filters is constantly zero even after the passage of time. Thus, by using such filters as described above, powder is prevented from intruding through the filters and is only deposited on the exterior thereof in the form of a thin film, through which communication of pressures can always be easily effected. Thus, it is always possible to accurately measure differential pressure without any fluctuations occurring in the characteristics of the high-pressure duct 8, the low-pressure duct 9 and the differential pressure detecting device. Accordingly, there is substantially no need to perform maintenance work or the like.

Further, due to this arrangement, it is possible to markedly diminish the size of the entire sensor system for converting a powder feed amount into an electric signal. In addition, the adjustment of all the parts of the apparatus and the assembly thereof can be finished prior to shipment, thereby practically eliminating field installation work. Thus, unlike in the prior art, no flexible piping or the like, whose configuration and size are liable to be adversely affected when it is installed and thereby affect the characteristics of the sensor systems, is introduced into the sensor system. Thus, it is practically unnecessary to perform field adjustment work.

Further, while the sensor system according to the prior art technique requires five pipes and three sets of flow rate control means, the sensor system of the present invention requires only one pipe, one cable and a single set of flow rate control means, so that the sensor system of the present invention greatly contributes to a reduction in the production and installation costs. Moreover, due to this advantage of the present invention, a series of sensor systems can be easily detached from the apparatus when performing cleaning, color change, etc.

The powder feeding apparatus and the electrostatic powder coating apparatus of the present invention shown in FIG. 1 is supplied with a gas 62. A portion of the gas 62 is conveyed through a pipe 31 and a constant pressure valve 33 to be used for the fluidization of the powder 39 in the tank 38. The major portion of the gas thus used for the fluidization of the powder is dissipated into the atmospheric air from the surface of the powder in the tank. The remaining portion of the gas used for the fluidization is conveyed through a pipe 32, a constant pressure valve 34 and a three-way valve 45 to be used to open and close a pinch valve, which is provided inside a housing 44 and consists of a pinch rubber member 43. This remaining portion of the gas, which is thus used for the opening and closing of the pinch valve, is also eventually dissipated into the atmospheric air via the three-way valve 45.

That portion of the gas 62 which is not used for the fluidization of the powder is controlled to a fixed pressure by a constant pressure valve 35. A part of this portion of the gas 62 may be adjusted to a fixed flow rate by a pressure regulating valve 51 and conveyed via a pipe 50 to be used in a discharge pattern adjusting means 49, which consists of a revolving flow forming device or the like, of the electrostatic powder coating gun 48. The flow rate of the gas thus used, however, is quite small.

Most of that portion of the gas 62 which is not used for the fluidization of the powder is conveyed through a flow rate control device 28, which has a setting function, and divided into three portions by branch pipes 24, 25 and 27. However, these three portions are eventually united together to be used for the feeding of the powder through the large-diameter feeding duct 47. Thus, in the present invention, the means for supplying the total amount of gas to be eventually used for the feeding of the powder through the large-diameter feeding duct 47 is referred to as a feeding gas supply means, which is generally indicated by an arrow 56 in FIG. 1.

This feeding gas supply means, indicated by the arrow 56, is controlled by the value of a requisite feeding gas flow rate, which is determined by the operating conditions of the electrostatic powder coating gun 48. A set value 18 is supplied from a setting device 16-1 to the principal section of the feeding gas supply means 56 and compared with an input 17, that is, the powder feed amount. The difference obtained by this comparison is amplified and transmitted via a control valve 20, which is controlled by a feedback output 19 of a control device 16-2, and via a pipe 24 to the nozzle 21 of the injector 23, thereby effecting automatic control in such a way that the pressure difference between the inlet 4 and the outlet 5 of the measurement capillary 180, i.e., the powder feed amount 17, coincides with the set value 18.

Regarding this automatic control, the following disturbance factors should be taken into account: the level of the powder in the tank, the duct resistance due to powder adhering to the inner surface of the large-diameter feeding duct 47, the level of the gun 48, and the fluctuations in the sucking force due to wear of the injector throat. The flow rate of the gas flowing through the duct 24 increases or decreases in accordance with these disturbance factors. On the other hand, of the gas flowing through the pipe 25 decreases or increases in response to the increase or decrease of the flow rate in the pipe 24. This decrease or increase of the flow rate in the pipe 25 is effected by a flow rate balance control means for keeping the sum of the flow rates in the pipes 24, 25 and 27 constant, for example, by the action of a duct resistor 26 provided in the pipe 25, and the gas flowing through the pipe 25 is introduced to the large-diameter powder feeding duct 47 through a feeding rate adjusting gas introducing means 46. As a result, the flow rate of the feeding gas in the large-diameter feeding duct 47 is always kept at a fixed value. Thus, the feed amount of the powder to be ejected through the gun 48, the amount of gas ejected from the gun, and the function of the pattern adjusting means, are all free from the influences of the disturbance factors mentioned above, whereby predetermined operating conditions can be constantly maintained. In this way, it is possible to achieve major economic advantages, such as an improvement in coating efficiency, stable and uniform film-thickness distribution, substantial cost reduction on coating material, and improvement in product quality.

Numeral 36 indicates an instructing or recording means for controlling the powder feed amount 15, and numeral 37 indicates an instructing or recording means for controlling the general operating conditions. In the example shown in FIG. 1, the pressure of the gas for driving the injector is used in the means 37.

A corona discharge electrode 58 is provided at the tip of the electrostatic powder coating gun 48. Electric power from a power source 54 is supplied through a conductor 55 to a high voltage generating circuit 57 to generate a high voltage, which is applied to the corona discharge electrode 58, whereby the powder is charged and an electric field is generated between the gun and the object to be coated 53, thereby effecting electrostatic powder coating.

The electrostatic powder coating gun and the power source used in the electrostatic powder coating apparatus of the present invention are not restricted to those shown in FIG. 1. It is possible to use any type of electrostatic powder coating gun system equipped with a means for electrically charging powder, a means for electrically driving the powder toward the object to be coated, and a means for ejecting the powder in a dispersed manner. By using a powder feeding apparatus as described above, i.e., the novel electrostatic powder coating apparatus of the present invention, it is possible to markedly improve the performance of an electrostatic powder coating apparatus.

In the electrostatic powder coating apparatus of the present invention, the powder charging can be effected by contact charging, a discharge-electrode couple provided inside the gun, a combination of a corona discharge electrode provided at the tip of the gun and an auxiliary electrode provided outside the gun, or a combination of a corona discharge electrode provided at the tip of the gun and the object to be coated, etc.

Examples of the means for electrically driving the powder toward the object to be coated include: a space charge electric field formed by the charged powder as it travels toward the object to be coated, and a mutual action between the charged powder and an electric field formed between the object to be coated and an electrode which is provided near the tip of the gun and to which a high voltage is applied.

Examples of the means for discharging the powder in a dispersed fashion include: a diffuser, a revolving flow, spraying through a slit, or a combination of these means.

In the electrostatic powder coating system shown in FIG. 1, when the large-diameter feeding duct 47 consists of a hose which is made of an ordinary material like urethane EVA, powder may adhere to the inner surface of the large-diameter feeding duct 47 after the elapse of operating time, depending upon the type of coating material used, with the result that the gas flow rates in the pipes 24 and 25 are thrown considerably off-balance. In such a case, it is necessary to close the pinch rubber member 43 and perform a blowing operation in which a large amount of air is supplied for a short time from the inlet 46 and the nozzle 21 by some appropriate means (not shown) so as to remove the powder deposited on the inner surface of the duct 47.

This blowing operation not only necessitates an interruption of the normal operation, but contaminates the inner surfaces of the booth with the powder blown out of the gun at high speed, thereby interfering with the color change operation in the booth. In accordance with the present invention, this problem is solved by forming the interior of the large-diameter feeding duct 47 of a non-adhesive resin, such as a fluororesin like teflon or a high-density polyethylene, as needed. More preferably, such a non-adhesive resin is a conductive one.

In some cases, a composite hose, whose exterior is made of a different material from the above, such as urethane or EVA, is used for the purpose of improving the mechanical performance of the large-diameter feeding duct as a whole. Further, a grounding means for disposing of the charge accumulated in the conductive portion, etc. may be provided.

By thus forming the large-diameter feeding duct, the resistance of this feeding duct is diminished and, at the same time, the growth rate of the adhering powder is reduced, so that the cycle of the blowing operation is made longer. Thus, when the normal operation is not performed or when color change is effected, it is only necessary to perform the above-described cleaning, which does not entail contamination of the interior of the booth. Thus, the field workability is improved and the effective operating time is augmented, thereby improving the cost efficiency of the apparatus.

A fluororesin or a conductive fluororesin may be used not only in the interior of the large-diameter feeding duct 47, as described above, but also in the interior of the injector throat 22 and the sensor tube 1, whereby a remarkable improvement can be achieved, in many cases, in terms of service life and performance stability. Thus, this arrangement constitutes an important feature of the present invention.

Further, though not shown in FIGS. 1, 11, etc., the injector throat 22, the sensor tube 1, etc. are replaceable as needed. These components are set in a housing 59. A fluororesin or a conductive fluororesin 1a may be applied also to this housing and to those sections which come into contact with powder, such as the nozzles 3 and 21, whereby color change can be conducted more quickly and the inspection cycle can be shortened.

Figure 2:
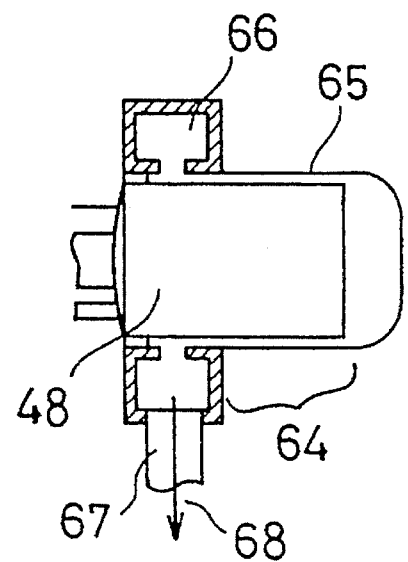
FIG. 2 is a schematic diagram illustrating an exterior cleaning means in the electrostatic powder coating gun in FIG. 1.
Figure 3:
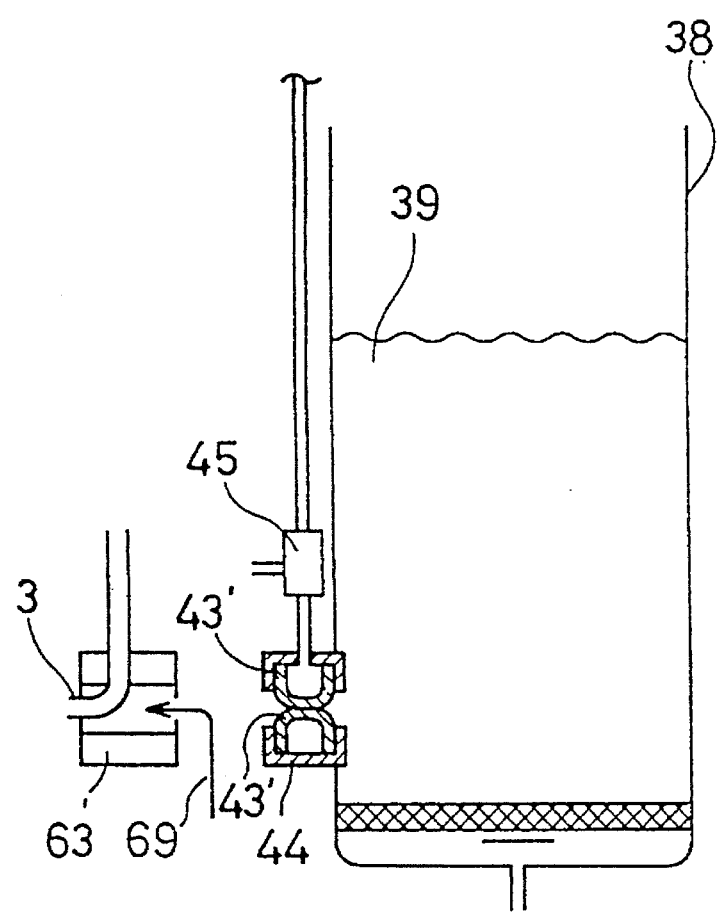
FIG. 3 is a partial view illustrating the condition around the coating material tank when effecting color change in the apparatus of FIG. 1.

With reference to FIGS. 2 and 3, together with FIG. 1, an example of the way color change for coating materials is conducted in the electrostatic powder coating apparatus of the present invention will be schematically described. Referring to FIGS. 1 and 3, the three-way valve 45 is operated to pressurize the pinch rubber member 43 in the housing 44 so as to deform the pinch rubber member 43 into a state as indicated at 43'. In this way, coating material is prevented from flowing out of the tank. Then, the duct end 63 of the housing 59 is detached from the tank, and, as shown in FIG. 2, a gun cleaning means 64 is fitted onto the electrostatic powder coating gun 48.

The gun cleaning means 64 is composed of a cap 65 which extends several mm along the side surface of the electrostatic powder coating gun 48 and whose front end is closed, a ring chamber 66 formed at the base of the cap 65 and hermetically connected therewith, and a discharge pipe 67 through which strong evacuation can be effected as indicated at 68.

In the condition shown in FIGS. 2 and 3, when strong air discharge, indicated at 68, is executed, a large quantity of air 69 is sucked through the duct end 63 to flow through the components in the order: the sensor tube 1, the housing 59, the injector throat 22, the large-diameter feeding duct 47, the interior of the electrostatic powder coating gun 48, and the exterior thereof, whereby the powder sticking to these components is removed to a degree sufficient for practical purposes, thereby making it possible to execute color change and cleaning.

In this process, a sufficient amount of air is usually passed through the pipes 24, 25 and 27. In some cases, apart from the natural suction of the air 69 through the duct end 63 shown in FIG. 3, pressurized air may be blown into the system, thereby obtaining satisfactory results.

The discharged air, indicated at 68, is conveyed to a dust collector, so that, in the cleaning/color-change means of the present invention described above, no powder is dissipated out of the system, whereby substantial secondary effects can be obtained. For example, the cleaning of related equipment, such as the interior of the booth for powder coating, is facilitated.

Further, the direction of the airflow used in cleaning or color change is not restricted to the one in the above-described example. It is also possible to blow in air at the discharge pipe 67 and to discharge it from the duct end 63. Further, it is also possible to provide a valve 61 somewhere between the discharge pipe 67 and the duct end 63, discharging air through this valve when performing cleaning or color change.

In the construction shown in FIGS. 1 and 11, it is desirable, in some cases, to perform back washing on the filters 6 and 7 from time to time, depending upon the physical properties of the powder. During back washing, bellows 162 and 164, which communicate with the high-pressure duct 8 and the low-pressure duct 9, respectively, are contracted by electromagnetic pistons 163 and 165, or a pressurized gas is caused to flow backwards through the ducts 8 and 9 by an electromagnetic valve. During this operation, the output signal indicating differential pressure is suspended, or the operation of the control valve 20 is suspended. The means for suspending the output signal, indicating differential pressure, or for suspending the operation of the control valve 20, can also be effectively utilized to improve the start characteristics of the intermittent, repetitive powder feeding operation of the system.

Referring to FIGS. 1 and 11, when only the powder flow rate detection gas 52 is flowing and no powder is flowing, it is usually desirable for the pressure difference generated between the inlet and the outlet of the sensor tube to be as close to zero as possible from the viewpoint of the designing, adjustment, etc. of a signal processing device 14 for processing the output of the differential pressure detecting device 12. Referring to FIG. 11, this condition can be achieved through an appropriate combination of the inner diameter and length, indicated at 182, of the measurement capillary 180 and the inner diameter, indicated at 181, of the sensor nozzle 3.

Figure 14:
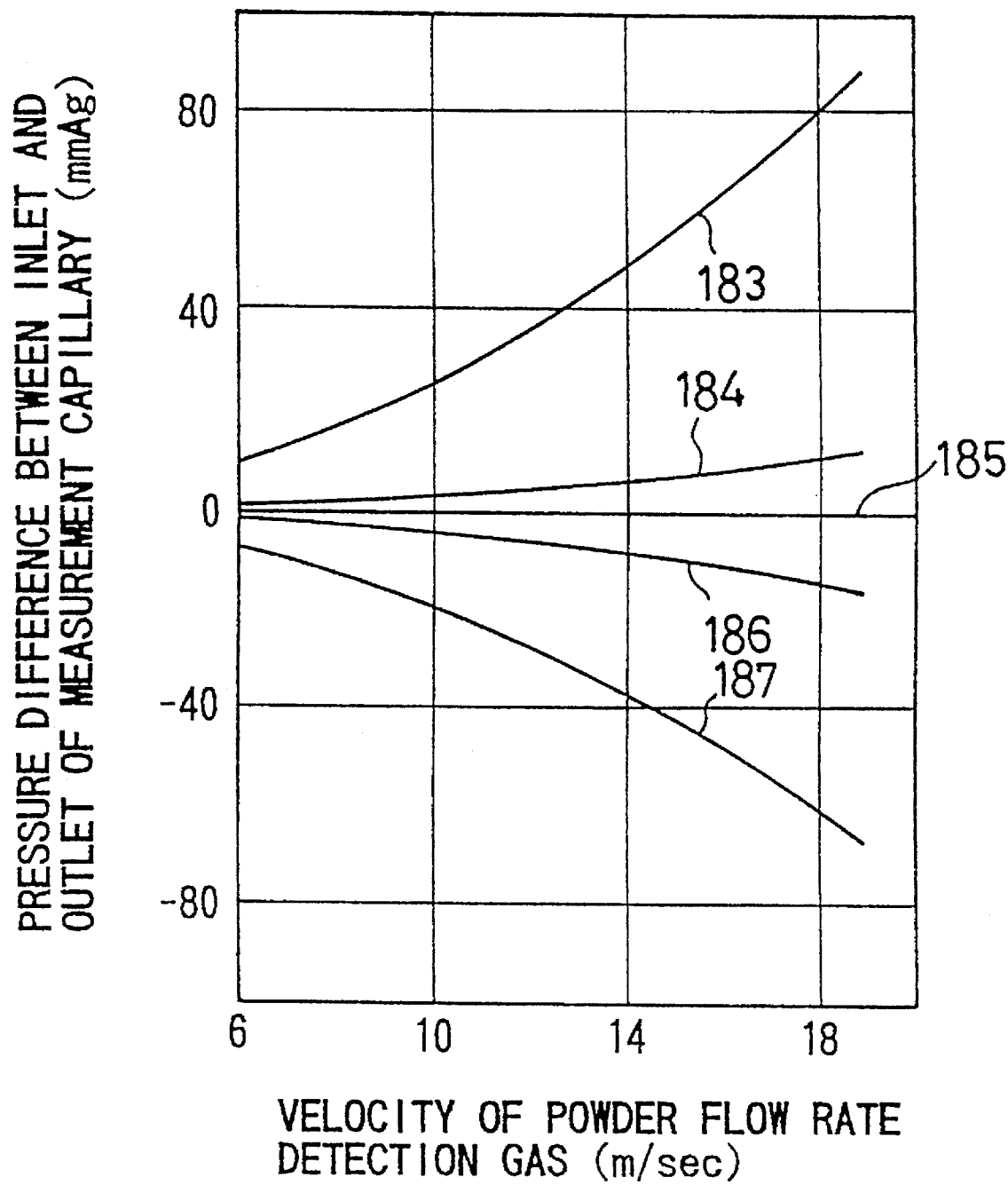
FIG. 14 is a chart showing the characteristics of a powder feed amount measuring apparatus according to the present invention when no powder is being fed.

Theoretically, the pressure difference in the above-mentioned condition can be made substantially zero by the negative and positive pressures cancelling each other. The negative pressure is due to the injector effect, generated by the powder flow rate detection gas 52 blown into the sensor tube 1 from the sensor nozzle 3; and the positive pressure is generated by the powder flow rate detection gas 52 flowing through the sensor tube 1. Such a cancelling can be effected within the flow velocity range of 7 to 20 m/sec, within which no powder deposits on the inner surface of the sensor tube. The conditions for attaining this may be experimentally determined depending upon the purposes. FIG. 14 shows experimental data for determining the above conditions. In the drawing, numeral 183 indicates a case in which the nozzle diameter 181 is too large with respect to the diameter of the measurement capillary 180; numeral 184 indicates a case in which the measurement capillary 180 is too long, although the nozzle diameter is appropriate with respect to the diameter of the measurement capillary; numeral 187 indicates a case in which the nozzle diameter is too small; numeral 186 indicates a case in which the capillary is too short; and numeral 185 indicates a case in which the relationship of the nozzle diameter to the length and diameter of the capillary is an appropriate one. In the last case, indicated at 185, the pressure difference can be made substantially zero when the powder flow rate detection gas is flowing through the sensor tube at a velocity within the range of 7 to 20 m/s.

The above condition is not necessarily essential for all cases in the present invention. However, this condition is important to improve the reliability of the apparatus when the top of the powder tank is open to the atmospheric air or a powder which is hard to fluidize is used.

Figure 7:
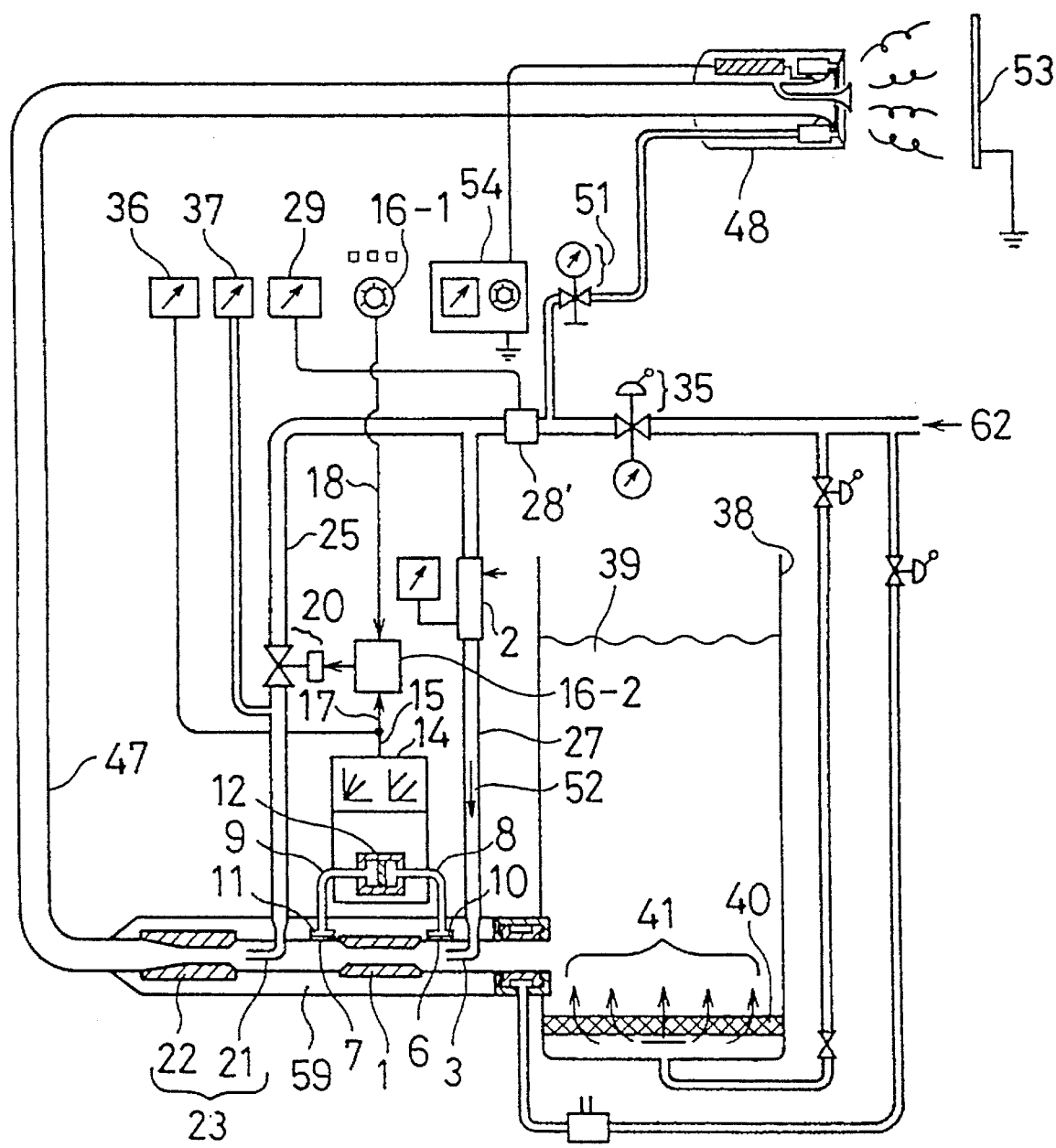
FIG. 7 is a schematic diagram showing the construction of an electrostatic powder coating apparatus according to another embodiment of the present invention.

FIG. 7 shows another embodiment of the present invention. Unlike the embodiment described with reference to FIGS. 1, 2 and 3, this embodiment does not include the flow rate control device 28 for supplying carrier gas, shown in FIG. 1. Instead, it includes a flow rate transmitter 28' for measuring the amount. In addition to this flow rate transmitter, an indicating or recording means 29 for operation control is generally employed. Apart from the above, there is substantially no difference between the embodiment shown in FIG. 7 and that shown in FIGS. 1, 2 and 3, in respect to structure, function, operation, cleaning, color change, etc.

In the embodiment shown in FIG. 7, it is not necessary to rigidly control the quantity of carrier gas. This embodiment, however, provides a powder feeding apparatus or an electrostatic powder coating apparatus which is capable of reliably maintaining a fixed amount of powder feed for a long period of time, which can be installed, adjusted, maintained and operated easily, and which provides excellent cost effectiveness.

In the embodiment of the present invention shown in FIG. 7, the control device 16-2 and the control valve 20 are operated in such a way that the differential-pressure-output electric signal 15, which indicates the amount of powder feed, is kept at a predetermined value, thereby keeping the powder feed amount constant. In this process, the flow rate of the gas flowing through the pipe 25 varies in response to the operation of the above components.

Since the flow rate of the powder flow rate detection gas flowing through the pipe 27 is always kept constant by the flow rate control means 2, the total amount of this flow rate detection gas is measured by the flow rate transmitter 28' and indicated or recorded by the indicator 29. During operation, the powder feed amount is determined by the setting device 16-1, with reference to the above amount. If necessary, a gas (not shown) for adjusting the powder feeding rate in the large-diameter feeding duct may be diverted upstream of the control valve 20 of the pipe 25 and introduced to the outlet of the injector 23.

The electrostatic powder coating gun 48 of this embodiment differs from that of the embodiment shown in FIG. 1, in that it controls the discharge pattern through a combination of a diffuser and a ring-shaped rectilinear flow. In the embodiment shown in FIG. 7, a non-adhesive resin offering little frictional resistance and relatively free from adhesion of powder, such as a fluororesin, in particular, a conductive fluororesin, or a high-density polyethylene, preferably a conductive one, is used for the large-diameter feeding duct 47, whereby it is possible, in many cases, to diminish the amplitude of the fluctuations in the carrier gas needed for automatic control of the powder feed amount, thereby providing advantageous results. This is an important feature of the present invention, and proves particularly effective in the embodiment shown in FIG. 7.

In accordance with the present invention, similar effects can be obtained with respect to the sensor tube 1 and the injector throat 22. It is not always necessary for the filters 6 and 7 to be ring-shaped as shown in FIG. 1. They may also be shaped as half-rings as in the case of FIG. 7.

Figure 8:
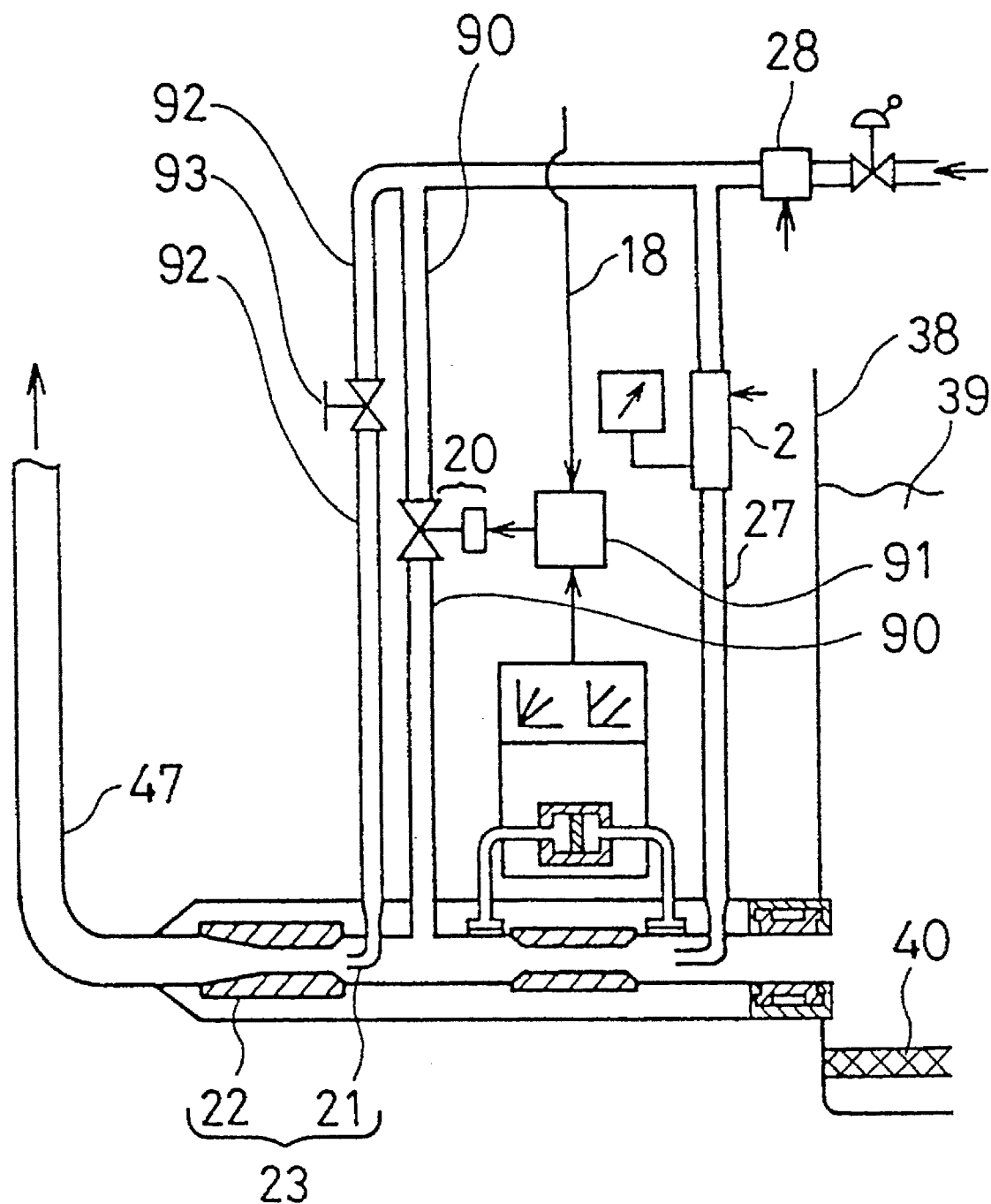
FIG. 8 is a schematic diagram showing the construction of a powder feeding apparatus according to another embodiment of the present invention.

FIG. 8 shows still another embodiment of the present invention. The drawing only shows that section of the embodiment which distinguishes it from the embodiment of FIG. 7. In the drawing, the same components and functions as those in FIGS. 1, 2, 3 and 7 are indicated by the same reference numerals.

From the viewpoint of practicality, the embodiment of FIG. 8 is the same as that of FIG. 7. The former differs from the latter in the way the injector is controlled. The gas for driving the injector is adjusted to a constant pressure by the constant pressure valve 35 and controlled to a fixed flow rate by a duct resistor 93 before it is supplied to the nozzle 21; the control valve 20, which is attached to a pipe 90 and controlled by a control device 91, adjusts the sucking force of the injector 23. In the embodiment shown in FIG. 8, unlike in the embodiments shown in FIGS. 1 and 7, opening the control valve 20 causes the degree of vacuum at the outlet 5 to decrease, so that the sucking force of the injector 23 is lowered, thereby reducing the powder feed amount. On the other hand, closing the control valve 20 causes the powder feed amount to increase. Apart from the above, this embodiment is the same as that of FIG. 7.

In the case of the embodiment of FIG. 8, the measurement of the powder feed amount is conducted in the same manner as shown in FIG. 11, the measurement being controlled in the same way as in FIGS. 1 and 7. In FIG. 8, those portions having the same functions as those of FIGS. 1 and 7 are indicated by the same reference numerals.

Figure 9:
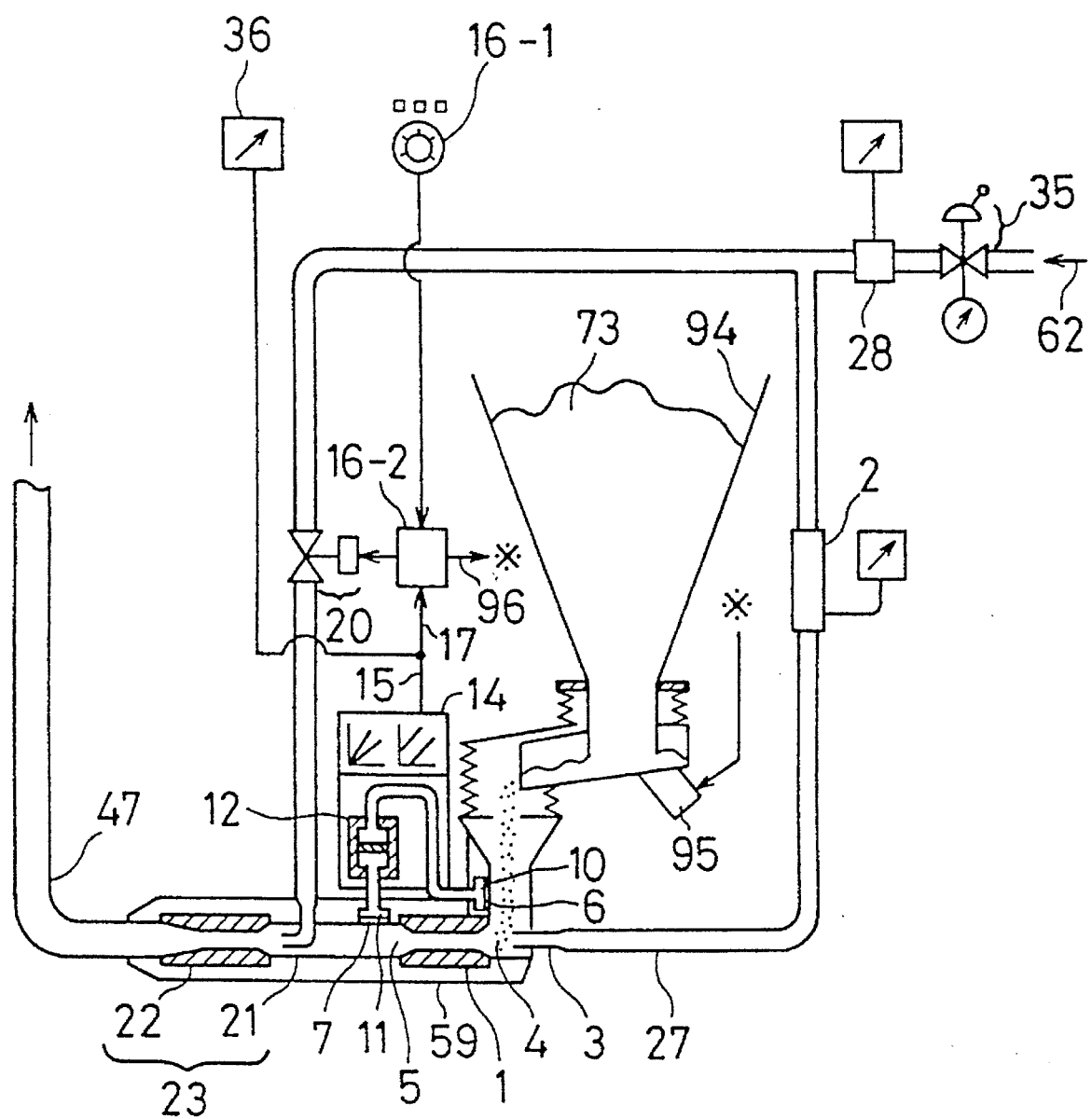
FIG. 9 is a schematic diagram showing the construction of a powder feeding apparatus according to still another embodiment of the present invention.

FIG. 9 shows a powder feeding apparatus according to the present invention in which a vibrating feeder is used as the powder feeding means. Such a vibrating feeder is also applicable to the electrostatic powder coating apparatus shown in FIGS. 1 and 7.

Referring to FIG. 9, the space around the inlet 4 of the sensor tube 1 communicates with the vibrating feeder only, and is hermetically separated from the exterior by a hopper 94 and a bulk powder material 73 contained therein, which bulk powder material constitutes a material seal. From a practical viewpoint, this arrangement provides the following remarkable advantage: if the sensor output characteristic when no powder is flowing is such that substantially no sucking force or blow-out force is generated irrespective of the flow rate of the powder flow rate detection gas, as in the case of the characteristic indicated at 185 of FIG. 14, the tank can be used, with the hopper 94 open, even when only a small amount of bulk powder 73 remains therein. In the embodiment of FIG. 9, the control device 16-2 controls a vibrator 95 as well as the control valve 20.

Though not shown in FIG. 9, in the present invention, it is also possible for the above structure using a vibrating feeder as the powder feeding means, to effectively adopt an arrangement in which, as in the case of FIG. 1, automatic control is applied to the total amount of the carrier gas, supplying the powder flow rate detection gas and the remaining portion of the injector control gas to the outlet of the injector through another pipe provided with a flow resistor so as to accurately keep the feeding rate in the large-diameter feeding duct 47 constant.

Figure 10:
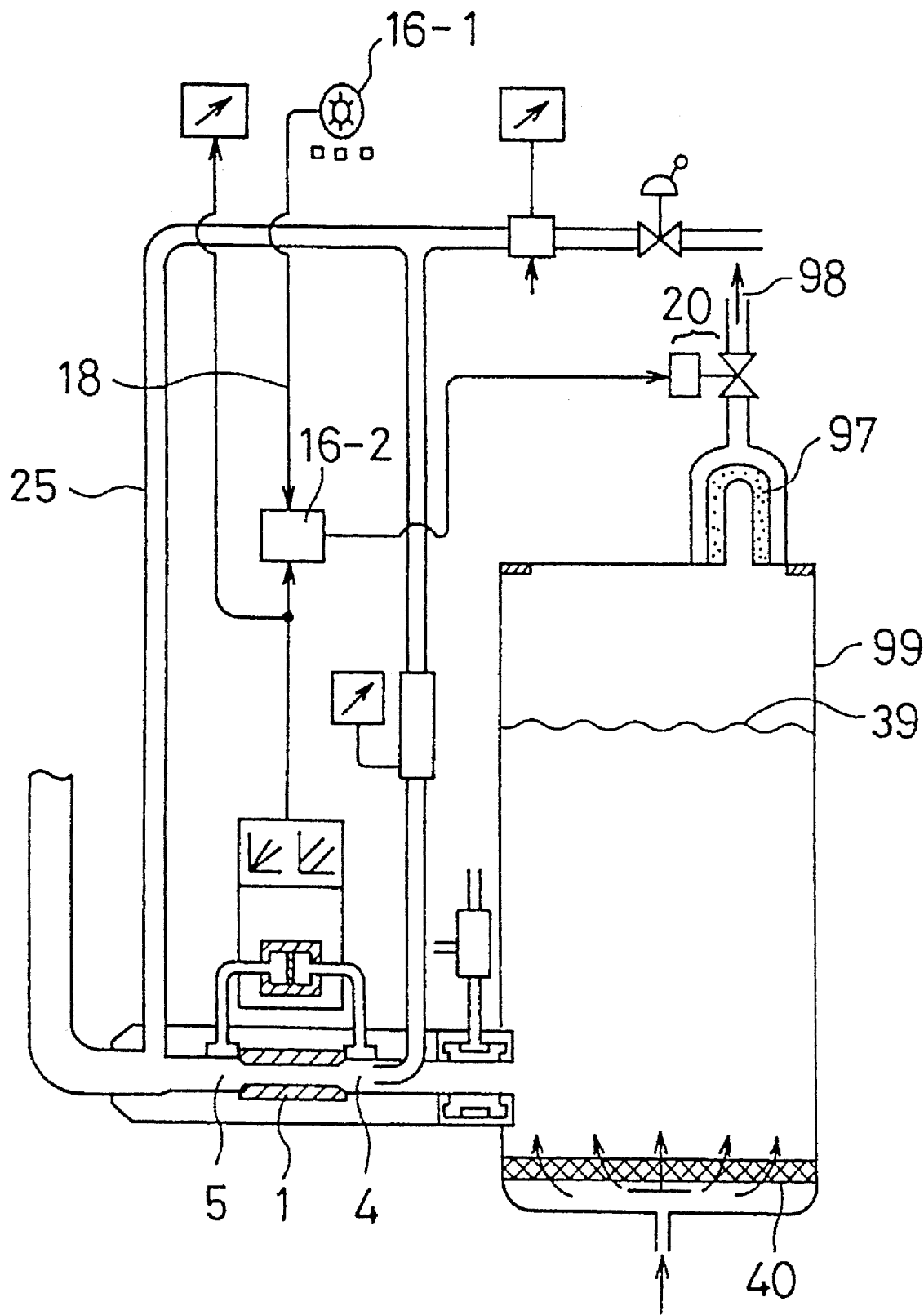
FIG. 10 is a schematic diagram showing the construction of a powder feeding apparatus according to a further embodiment of the present invention.

FIG. 10 shows an embodiment of the present invention in which powder is fed with a small amount of carrier air, without using any injector for powder drive. In the embodiment shown in FIG. 10, the powder feed amount is converted to an electric signal as a control output, which is utilized for operation control by the indicating/recording means, as in the embodiments of FIGS. 1, 7 and 8.

In FIG. 10, numeral 99 indicates an airtight tank having at its bottom a porous plate 40, through which a gas for fluidizing the powder 39 is supplied. This gas is passed through a filter 97 and the control valve 20 and discharged to the exterior of the system as an exhaust gas 98.

The control device 16-2 controls adjustment of the pressure difference between the inlet 4 of the sensor tube 1 and the outlet 5 thereof by opening or closing the control valve 20, and operates in such a way that the powder feed amount is matched with the set value 18 supplied from the setting device 16-1.

The flow rate control device 28 effects automatic control in such a way that the requisite amount of carrier gas 62 is provided in the large-diameter feeding duct 47. A portion of this gas, which is in a fixed amount, is conveyed through the pipe 27 and blown into the sensor tube 1 from the nozzle 3 as the powder flow rate detection gas 52. The remaining portion of the gas flows through the pipe 25 and is united with the above portion of the gas which is at the outlet of the sensor tube 1, thereby imparting a predetermined feeding rate to the powder.

Depending upon the requisite conditions, the pipe 25 need not be provided, the powder feeding being effected by means of the powder flow rate detection gas only. This is also one form of the present invention.

Figure 19:
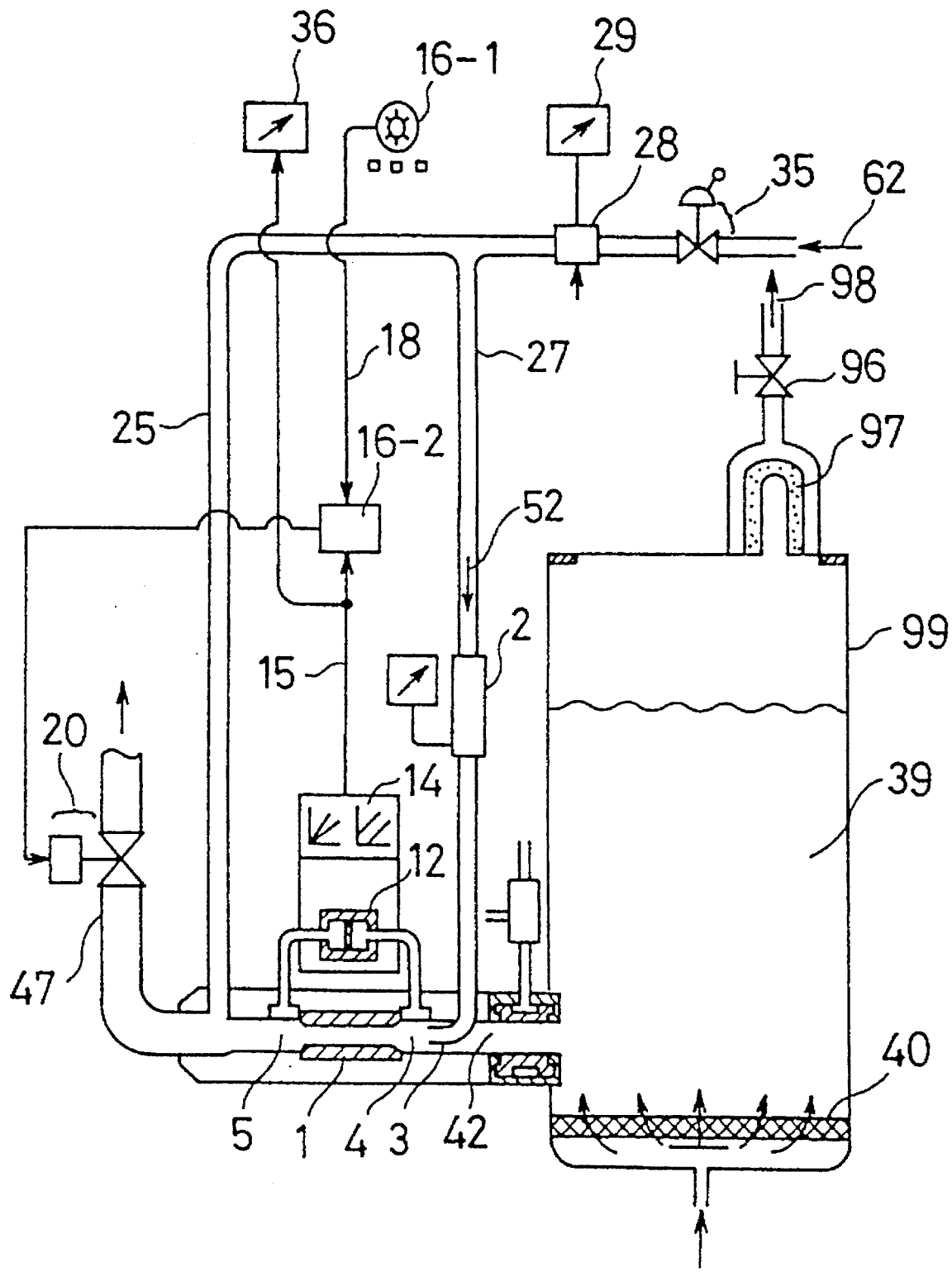
FIG. 19 is a schematic diagram showing the construction of a powder feeding apparatus according to still another embodiment of the present invention.
Figure 20:
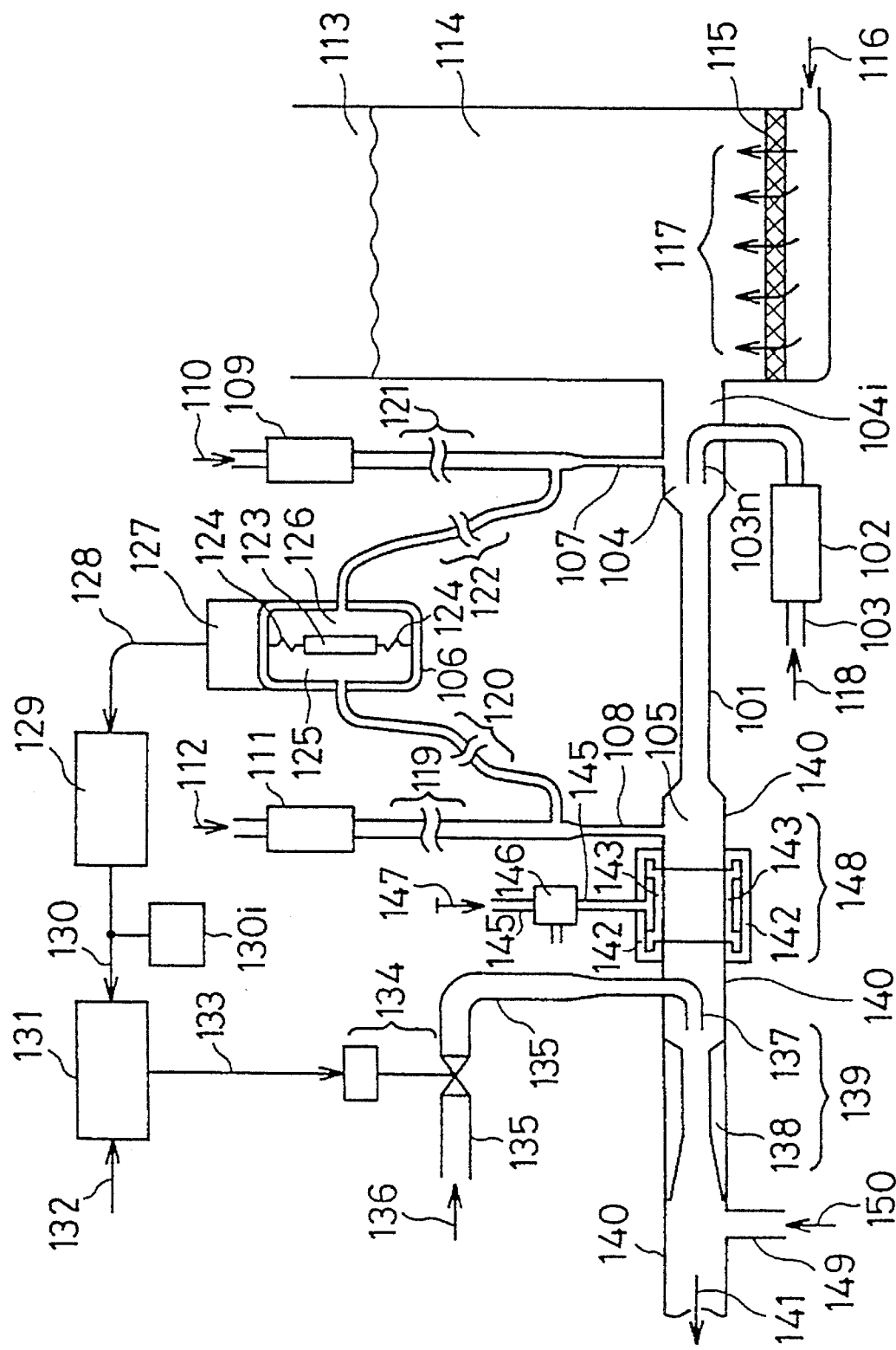
FIG. 20 is a general schematic diagram showing the construction of an conventional powder feeding apparatus.
Figure 21:
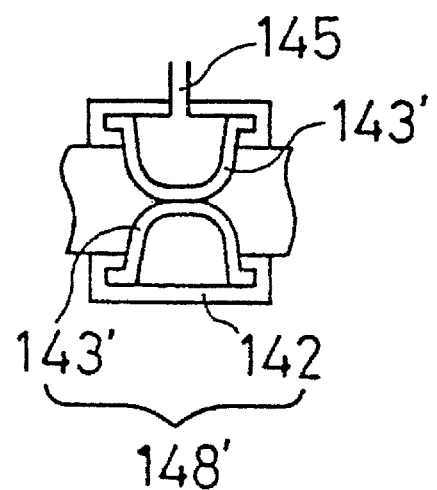
FIG. 21 is a schematic diagram illustrating the operation of a pinch valve in the apparatus shown in FIG. 20.
Figure 22:
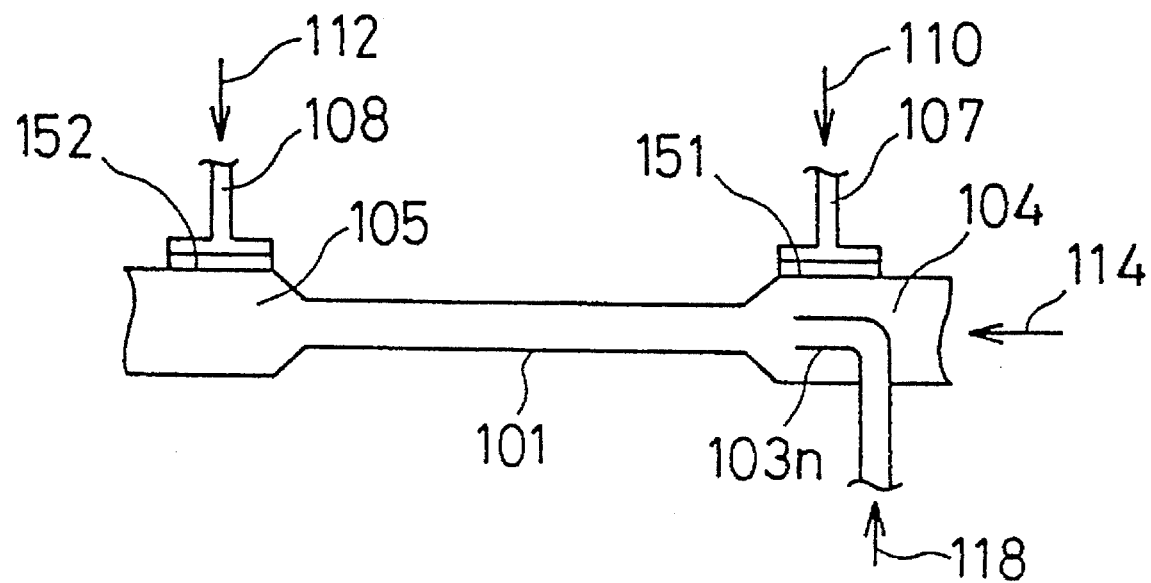
FIG. 22 is a schematic diagram illustrating the differential pressure detecting section of another conventional powder feeding apparatus.
Figure 23:
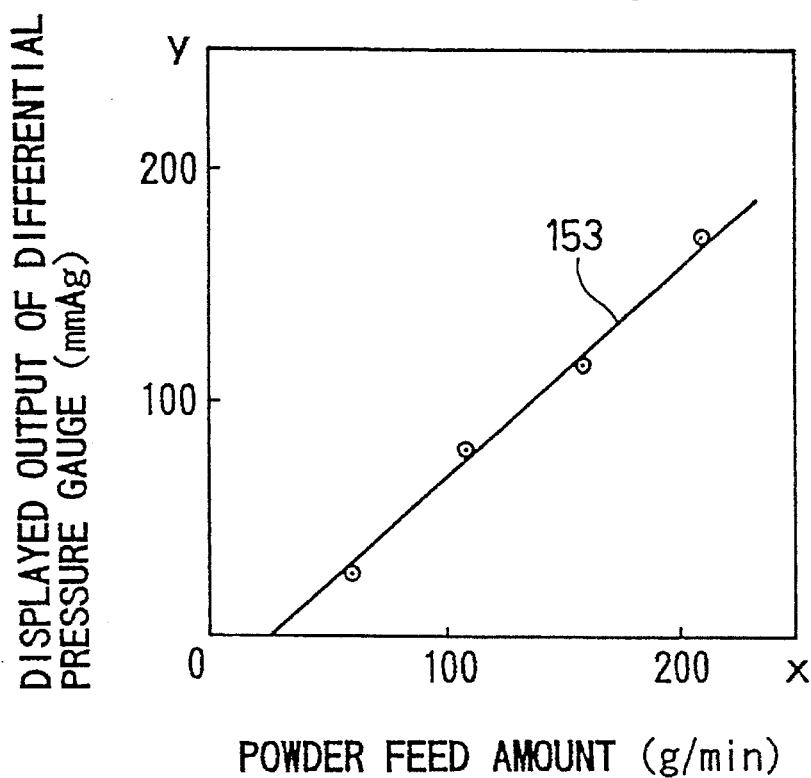
FIG. 23 is a chart showing an example of the feed-amount/output characteristics before adjustment of a conventional powder feeding apparatus.
Figure 24:
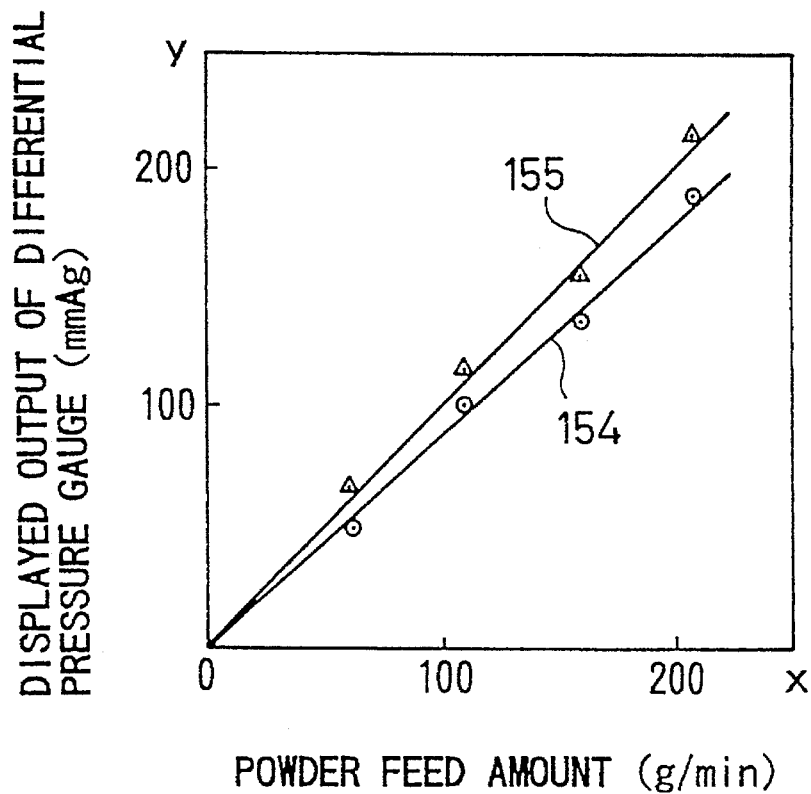
FIG. 24 is a chart illustrating procedures for adjusting the feed-amount/output characteristics shown in FIG. 23.

In principle, in the embodiment shown in FIG. 10, only one sensor tube can be used for one airtight tank 99. In this regard, FIG. 19 shows an embodiment which is an improvement over the embodiment of FIG. 10 in that a series of quantitative powder feeding units can be connected to a single airtight tank 99. The embodiment of FIG. 19 will be described only with respect to those points distinguishing it from the embodiment of FIG. 10.

In FIG. 19, the gas used for the fluidization of the powder flows through the filter 97 and is dissipated to the exterior of the system as exhaust gas, while an appropriate pressure is maintained inside the airtight tank 99 by means of a throttle valve 96.

The control device 16-2 controls adjustment of the pressure difference between the inlet 4 of the sensor tube 1 and the outlet 5 thereof by opening or closing the control valve 20, operating in such a way that the powder feed amount is matched with the set value 18 supplied from the setting device 16-1. Due to this operation, it is possible to operate a plurality of powder feeding systems with respect to the inner pressure of a single tank by supplying the feeding systems with different set values.

This embodiment is suitable for cases where powder is fed in parallel by using a very simple apparatus with a small amount of carrier gas. When powder is to be fed with the powder flow rate detection gas 52 only, the pipe 25 may not be used. Such an arrangement is also one form of the present invention.

Figure 18:
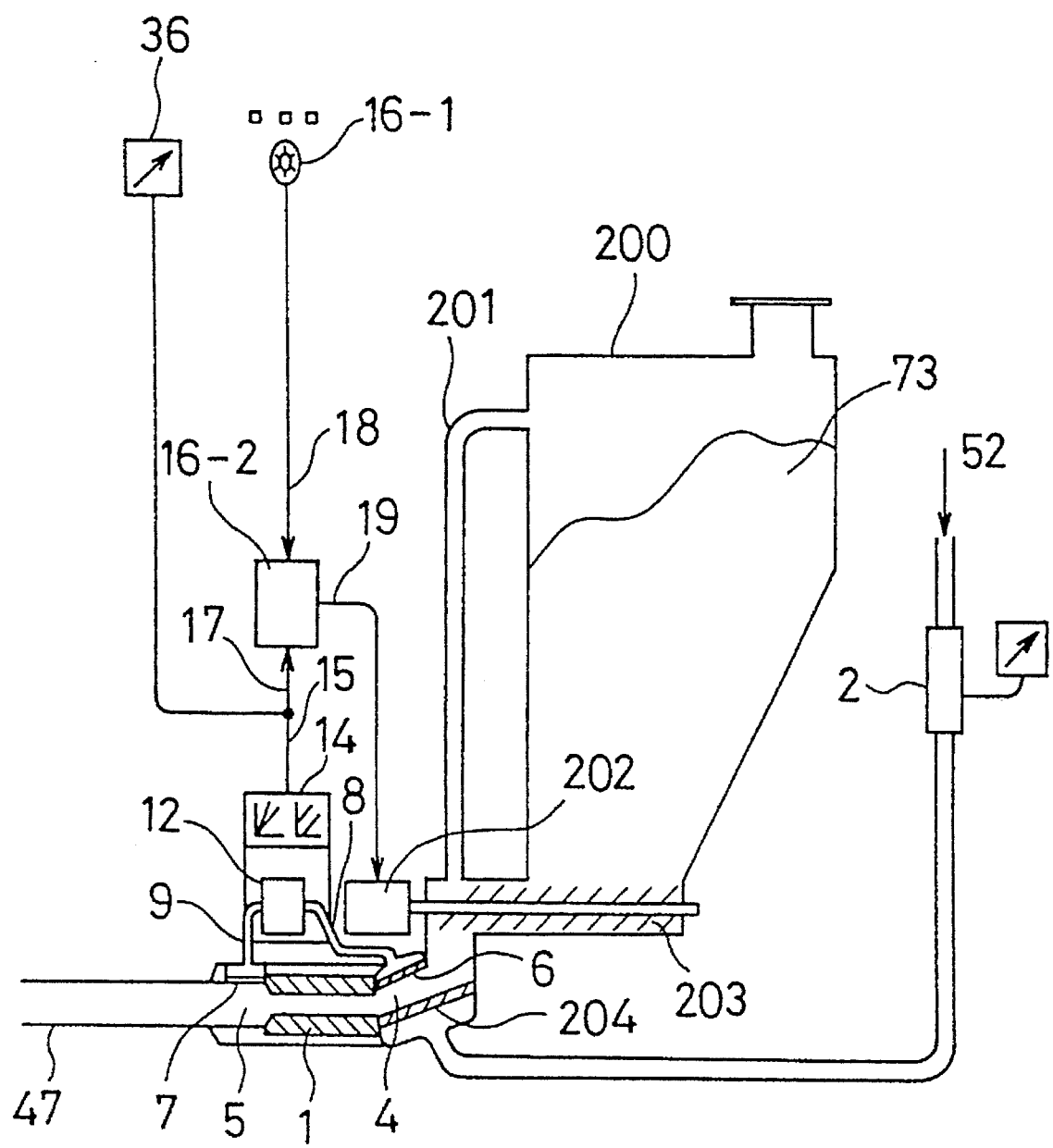
FIG. 18 is a schematic diagram showing the construction of a powder feeding apparatus according to another embodiment of the present invention.

FIG. 18 shows a powder feed amount measurement apparatus and powder feeding apparatus according to another embodiment of the present invention. In this embodiment, the powder flow rate detection gas 52 is controlled to a predetermined flow rate by the flow rate control means 2, and is passed through a gently inclined porous plate 204 before passing through the inlet 4 of the sensor tube 1. Then, the gas passes through the sensor tube 1 and flows into the large-diameter feeding duct 47 by way of the outlet 5 of the sensor tube 1.

The bulk powder 73, which is contained in an airtight hopper 200, is extracted by a bulk powder extracting or drawing-out device, such as a screw feeder 203, which is driven by a variable speed control motor 202, and falls onto the porous plate 204, through which the powder flow rate detection gas 52 is passing in a uniformly dispersed state. The bulk powder is then fed as a uniform powder flow and slowly approaches the inlet of the sensor tube 1. As soon as it enters the sensor tube 1, the powder is accelerated, and attains the same speed as that of the flow rate detection gas inside the sensor tube 1. Then, in accordance with the principle of the present invention, it generates a differential pressure which is proportional to the powder feed amount. This differential pressure is transmitted to the differential pressure detecting device 12 by way of the filters 6 and 7, the high-pressure duct 8, and the low-pressure duct 9, and is supplied to the signal processing device 14 to become an electric output signal. This electric signal is supplied to the control device 16-2, which is supplied with a set value from the setting device 16-1. The difference between the output signal and this set value is amplified to become the control output 19, which is supplied to the control motor 202 as a negative feedback, with the result that a constant powder feed amount is maintained.

Further, it is also possible to connect a pipe for varying the feeding rate to the large-diameter feeding duct, at a position on the downstream side of the sensor tube.

A connecting pipe 201 is provided for the purpose of always keeping the proper pressure balance between the inlet 4 and the space above the top surface of the bulk powder, thereby improving the control characteristics.

In this embodiment, when only the powder flow rate detection gas is flowing and no powder is flowing, the differential pressure between the inlet and outlet of the sensor tube 1 is not zero. However, this does not interfere with the operation of the apparatus since the embodiment employs a hopper 200 which is airtight. Any means for bringing powder to the inlet of the sensor tube in such a way that it is rapidly accelerated at the inlet of the sensor tube, as does the porous plate 204 in this embodiment, corresponds to the sensor nozzle of the present invention.

The powder extracting or drawing-out device of this embodiment may be appropriately selected in accordance with the kind of powder and the conditions of use. For example, a table feeder, screw feeder, groove-draw-out device, a pore-row draw-out device or the like may be used, as needed, in combination with an apparent-powder-specific-weight stabilization means at the inlet and a pulsating-flow-eliminating/flow-uniformalizing means at the outlet.

The embodiment described above with FIGS. 9, 10, 18 and 19 proves particularly effective when it is necessary to feed a homogenous powder with a very small, fixed amount of carrier air.

Further, an electrostatic powder coating apparatus based on these embodiments is also covered by the scope of the present invention.

Figure 4:
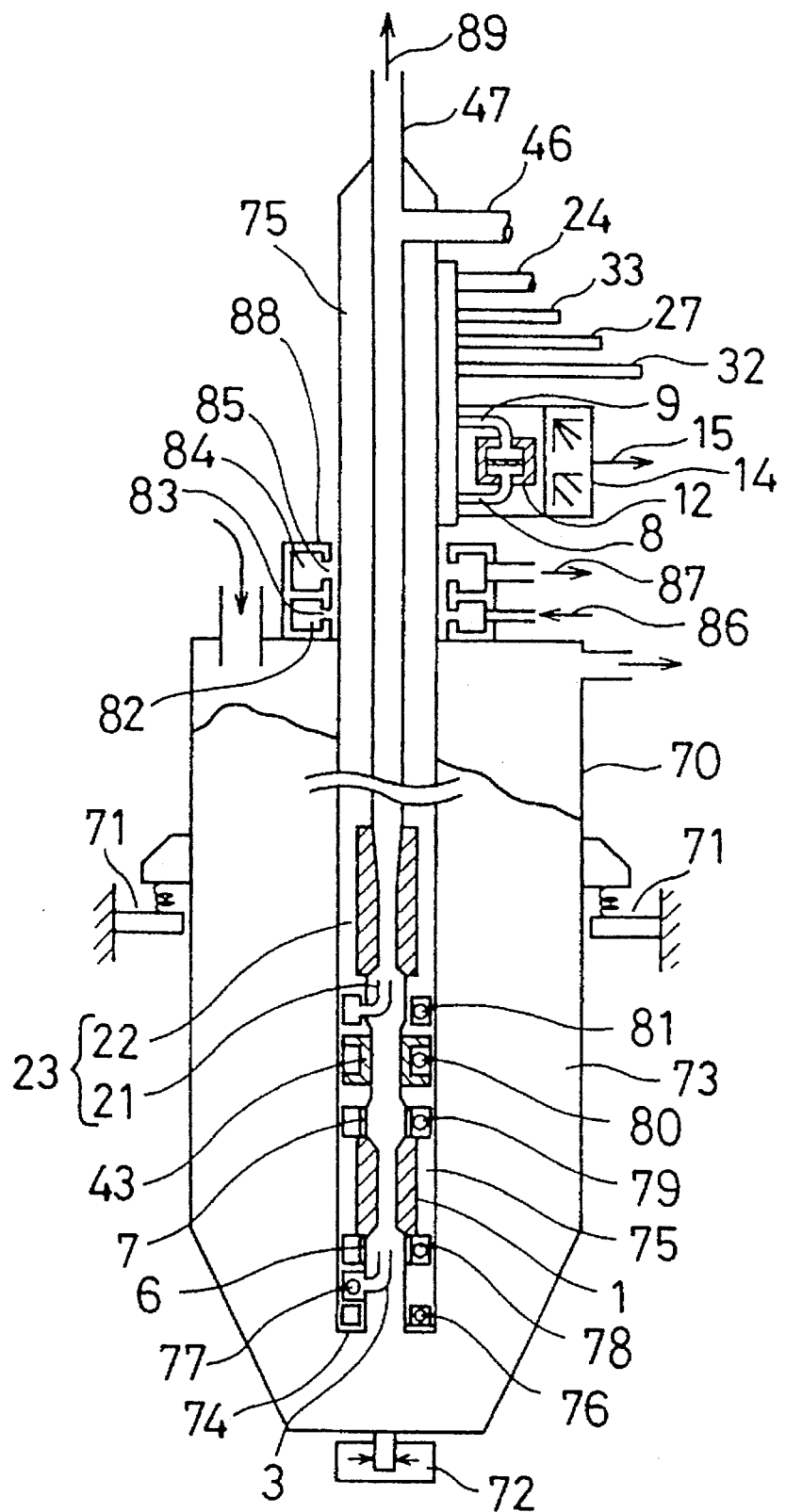
FIG. 4 is a schematic diagram illustrating a powder tank and sections combined therewith in a vertical powder feeding apparatus according to an embodiment of the present invention.
Figure 5:
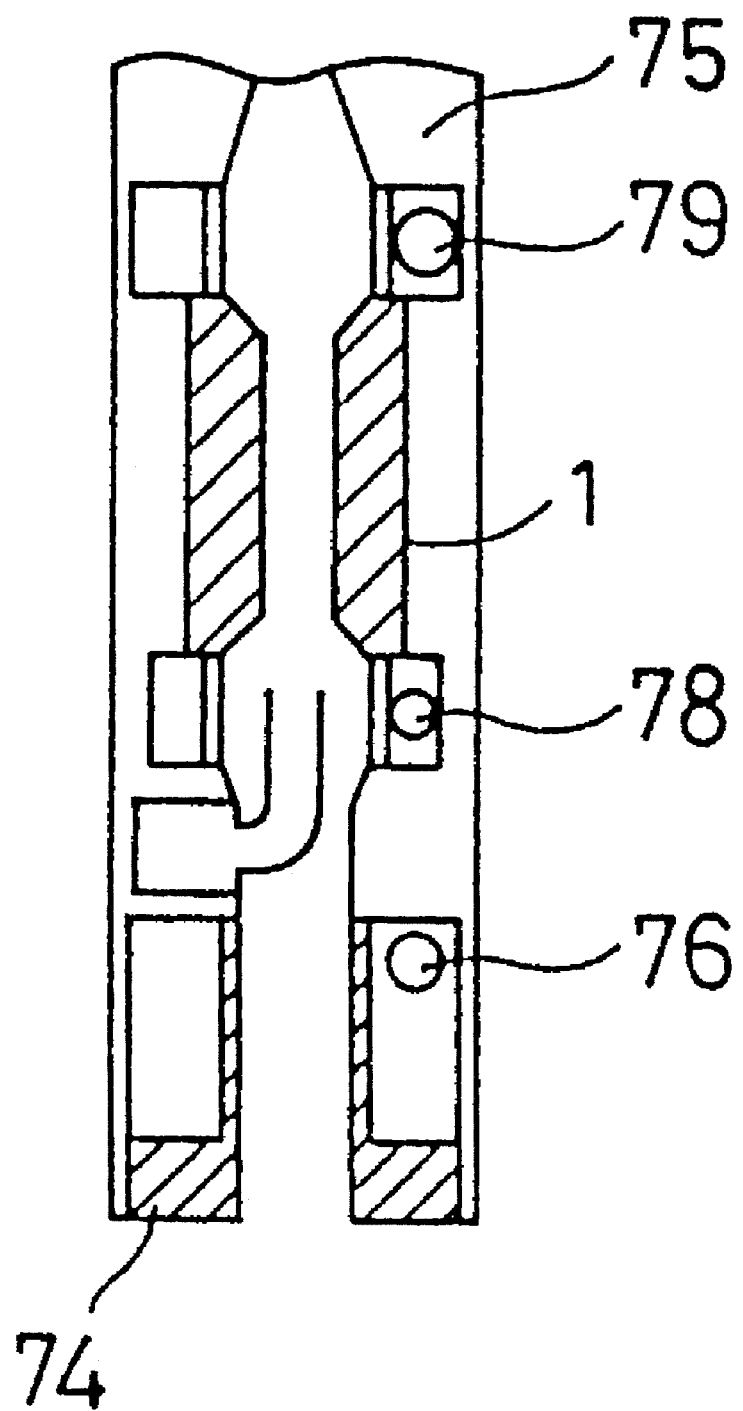
FIG. 5 is a schematic diagram illustrating how a partial fluidization is effected at the lower end of a vertical powder feeding shaft according to another embodiment of the present invention.
Figure 6:
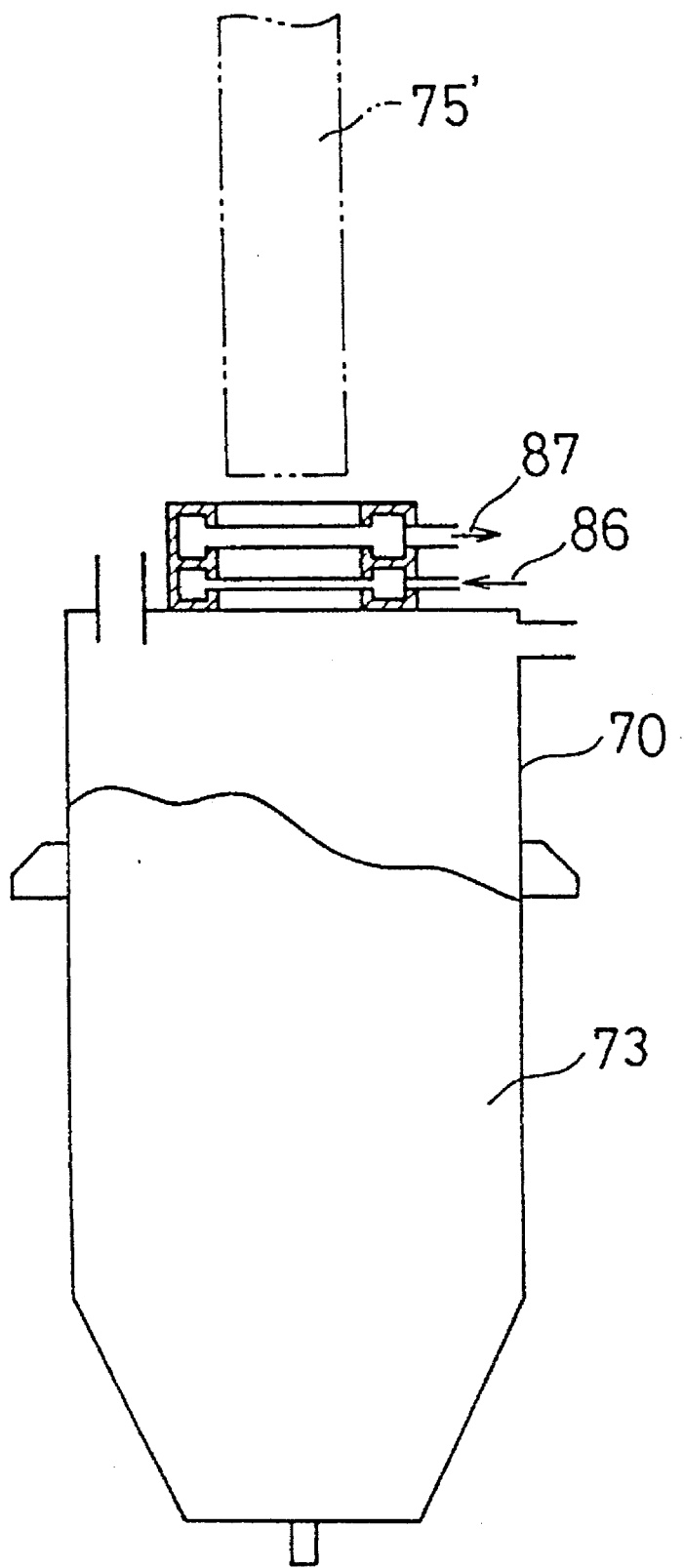
FIG. 6 is a schematic diagram illustrating how color change is effected in the embodiment shown in FIG. 4.

FIGS. 4, 5 and 6 show a powder feeding apparatus according to the present invention. This powder feeding apparatus is formed as a vertical powder feeding shaft 75, which is placed upright in the bulk powder 73, which is contained in a tank 70; powder is usually sucked up and fed starting from that portion thereof which is near the bottom of the tank. This vertical shaft system, however, can be applied to other objects than a bulk powder tank; for example, it can also be used in combination with a fluidization tank.

FIG. 4 shows a powder feeding shaft system according to the present invention. The system is shown in the operating condition. That portion of the powder which is in the lower end section of the shaft is partially fluidized by a small amount of fluidization gas which is supplied through a porous plate 74 at the lower end of the system. This fluidization gas is fed through a pipe 33 in the upper section of the powder feeding shaft and conveyed through a pipe (not shown) to an end opening 76 of thereof.

The powder flow rate detection gas, whose flow rate is controlled to a predetermined value, is supplied from a pipe 27 in the upper section of the shaft and conveyed through a pipe (not shown) to an end opening thereof. Then, it is conveyed through a nozzle 3 and blown into the sensor tube 1, whereby the powder which has been partially fluidized and has slowly moved to the section near the inlet of the sensor tube 1, is accelerated inside the sensor tube 1, thereby generating a pressure difference which is in proportion to the feed amount of the powder passing through the sensor tube 1, as described in detail with reference to FIG. 1, etc. This pressure difference is communicated by way of the filters 6 and 7, the pipe end openings 78 and 79, the high-pressure and low-pressure ducts 8 and 9, and the differential pressure detecting device 12 before it is converted by the signal processing device 14 into an electric signal as shown in FIG. 13.

A pinch rubber member 43 is provided on top of and adjacent to the the outlet of the sensor tube 1. This pinch rubber member is opened and closed by a pipe 32 which is provided in the upper section of the shaft, which pipe is connected to a pipe end opening 80. During operation, the pinch rubber member is held in the open state, as shown in the drawing.

Further, an injector 23 which consists of a nozzle 21 and a throat 22 is provided on top of the pinch rubber member 43. The nozzle 21 of this injector is connected to a pipe 24 which is in the upper section of the shaft through a pipe end opening 81.

These functional parts, described in detail above, are contained in the shaft 75, as shown in FIG. 4. Though not shown in FIG. 4, those portions indicated by numerals 15, 32, 27, 33, 24, 46 and 47 are connected together in completely the same way as in the example of FIG. 1, and constitute a part of a powder feeding apparatus or electrostatic powder feeding apparatus which is similar to that shown in FIG. 1.

The tank is loosely supported by a support means 71, and is oscillated by an oscillation means 72 with an appropriate cycle and strength, in such a way that the bulk powder can always be fed in a stable manner to the partial fluidization section at the lower end of the shaft while forming a material seal on the inner surfaces of the shaft and tank, without becoming too tight.

While the construction of FIG. 4 has been described as a modification of the system of FIG. 1 that is obtained by forming it as a vertical shaft system, this should not be construed restrictively. The vertical configuration is applicable to all the systems based on the principles of the present invention, including those shown in FIGS. 7, 8, etc.

The vertical system configuration is advantageous in that it only requires a simple and inexpensive tank and that it allows color change to be effected easily. An air supply, indicated at 86, and an air intake, indicated at 87 and in a greater amount than the air supply, are effected through annular openings 83 and 85 and annular chambers 82 and 84, which are provided around the shaft 75 and in the upper section thereof. While effecting the above air supply and air intake, the shaft 75 is drawn out and brought to the condition shown in FIG. 6. Solely by drawing the shaft in this way, the exterior of the shaft is cleaned. This cleaning system can be easily automated.

The cleaning of the interior of the system may be performed in the manner described in detail with reference to FIG. 1, etc. When placing the shaft again in the bulk powder in the tank which is in the condition shown in FIG. 6, the shaft is immersed in the bulk powder while supplying partial-fluidization air through the constant pressure valve 33, with the pinch valve of FIG. 4 closed, and feeding the powder flow rate detection gas through the pipe 27.

FIG. 5 shows an example in which a porous plate for partial fluidization is also provided in the interior of the powder inlet of the shaft.

Further, instead of the porous plate for the partial fluidization to be effected in the lower section of the shaft, it is also possible, for example, to provide several or several tens of downwardly directed minute holes, through which a gas is jetted, whereby satisfactory results can be obtained with regard to the partial fluidization at the lower end of the shaft.

In the vertical shaft type powder feeding apparatus, the injector is at a position which is near the bottom of the tank and considerably deep in the powder. The pressure applied to that portion of the powder which is near the bottom of the tank is considerably large. The apparent specific weight of the gas/powder two-phase flow on the downstream side of the sensor nozzle is approximately $\frac{1}{30}$ of the apparent specific weight of the bulk powder, and the apparent specific weight of the gas/powder two-phase flow on the downstream side of the injector is $\frac{1}{100}$ of the bulk powder or less, so that, in comparison to conventional powder feeding systems generally in use at present, in which simply fluidized powder is sucked by an injector provided on the tank, the vertical shaft type powder feeding system of the present invention enables the powder pressure to be more effectively used for the feeding of the powder.

In the vertical shaft type powder feeding apparatus, electrostatic powder coating apparatus and powder feed amount measuring apparatus of the present invention, a smooth supply of powder to the inlet of the sensor tube is a requirement common to various forms of the invention. A prerequisite for meeting this requirement is that the fluidization of the powder in the powder tank should be effected in a satisfactory manner.

Figure 15:
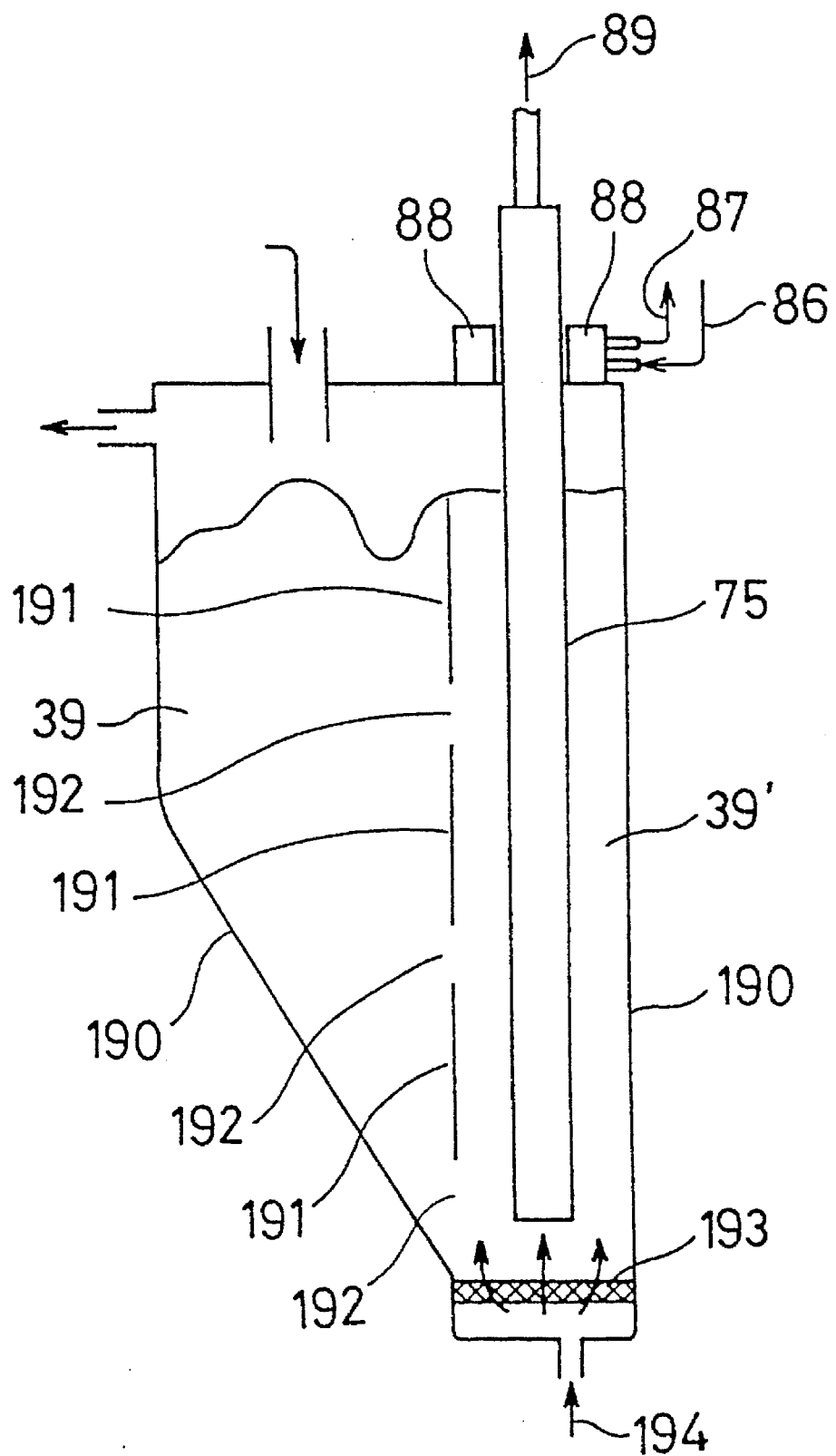
FIG. 15 is a longitudinal sectional view of the tank of a powder feeding apparatus according to an embodiment of the present invention.
Figure 16:
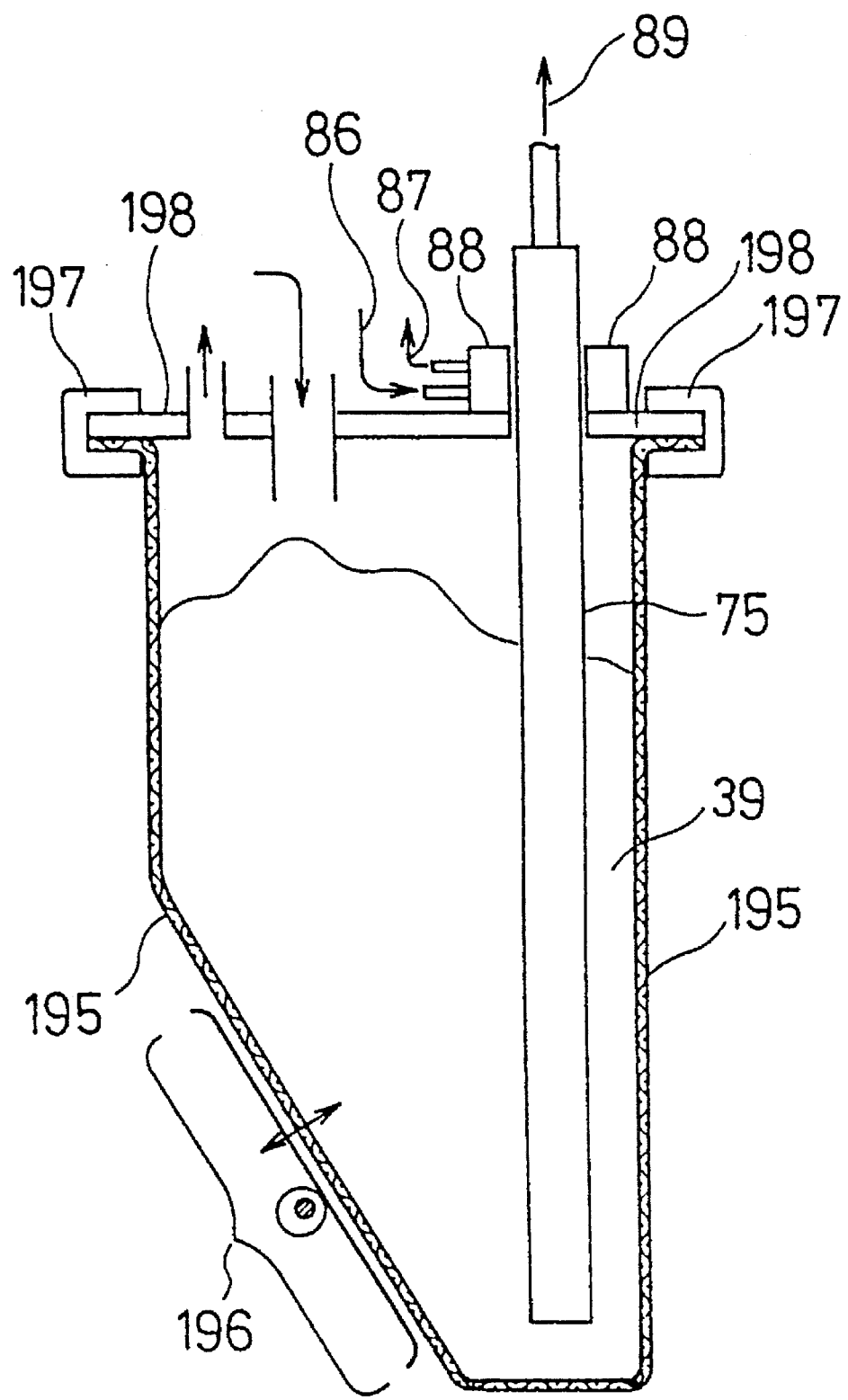
FIG. 16 is a longitudinal sectional view of the tank of a powder feeding apparatus according to an embodiment of the present invention.
Figure 17:
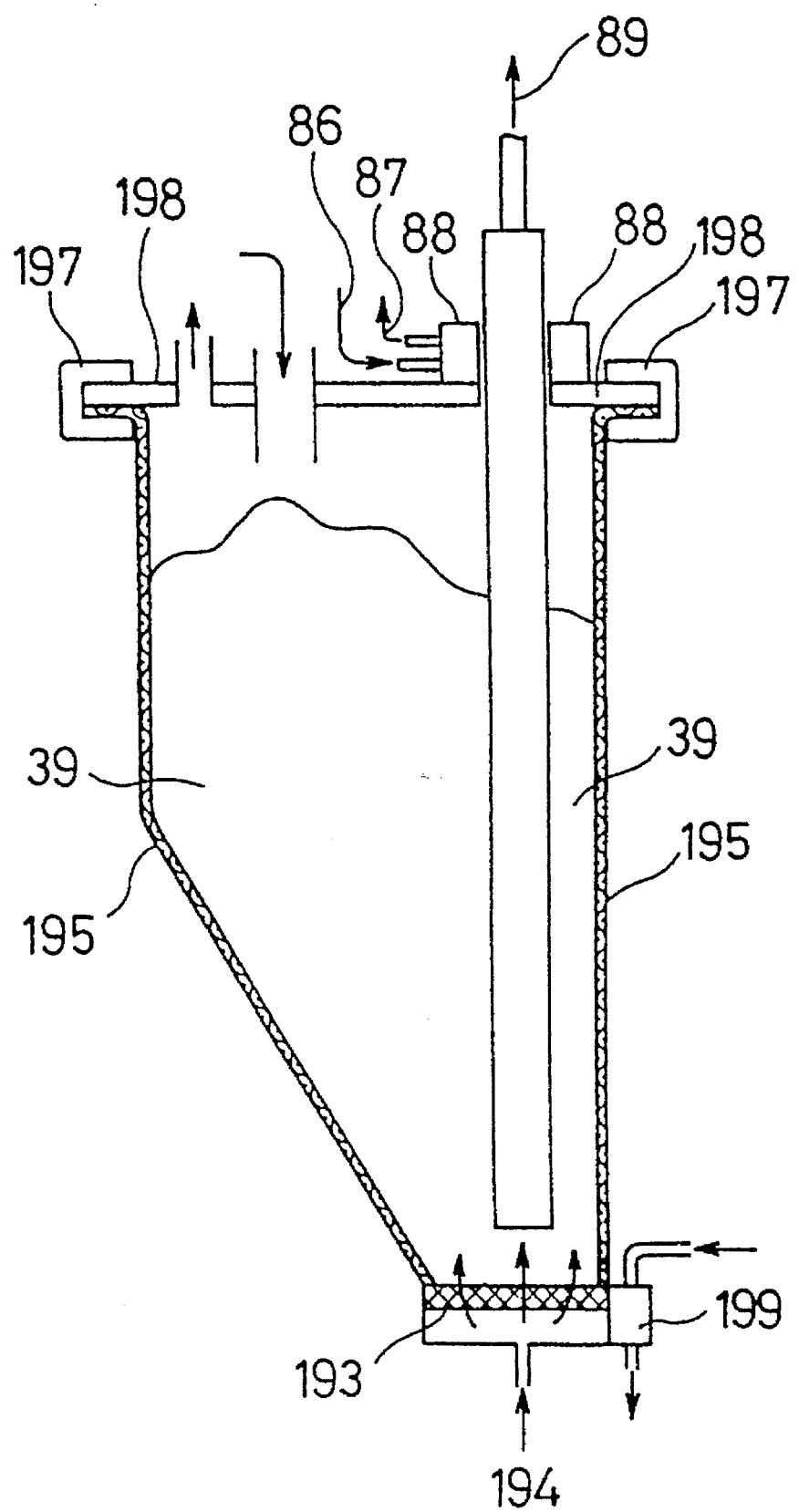
FIG. 17 is a longitudinal sectional view of the tank of a powder feeding apparatus according to still another embodiment of the present invention.

FIGS. 15, 16 and 17 show embodiments of a powder tank for realizing such a smooth supply of powder to the inlet of the sensor tube. In the embodiment shown in FIG. 15, a small-sized porous plate for fluidization 193 is used. To effectively operate this porous plate, a partition 191 is provided in such a way that the fluidization gas can effectively act on the portion of the powder above the porous plate 193 in the tank, which is tapered downwards to exhibit a sufficiently inclined inner surface. The fluidization is effected in a section 39' which is above the porous plate 193. In this section, the powder flows gently upwards and, in the upper section of the partition, moves to the side of the bulk powder 39. Then, it gently descends along the inclined wall. Thus, for the small size of the porous plate 193, which requires relatively low material and assembly costs, it is possible to effectively introduce the powder to the shaft end section and stir it inside the tank.

Flow passages 192 are provided at different, vertically separated positions of the partition for the purpose of turning the fluidized powder to bulk powder when the powder level inside the tank has become low.

The cleaning of the exterior of the powder feed shaft 75 at the time of color change, etc. is effected by an exterior cleaning means 88.

FIG. 16 shows an embodiment in which the tank is formed as a flexible tank 195 that is formed of a flexible material, such as a canvas sheet which has undergone a pore sealing process. In this case, the powder 39 in the tank is a bulk powder, which is constantly supplied to the lower end section of the powder feeding shaft by an oscillation means 196.

The flexible tank is attached to a top plate 198, which has a fixed configuration, by mounting members 197. The cleaning procedures at the time of color change, etc. are the same as those in the example shown in FIG. 15.

FIG. 17 shows an embodiment which provides satisfactory results when applied, for example, to a fine powder which is hard to fluidize. In this embodiment, the porous plate for fluidization 193 is provided at the bottom of the flexible tank 195, and a gas for fluidization 194 is supplied to this porous plate. Further, a vibrating means 199 is directly connected to the porous plate 193.

In the above-described arrangement, in which the small-sized porous plate 193 is supported by the flexible tank 195, the oscillation means 199 functions satisfactorily, thereby making it possible to easily fluidize even a powder which is hard to realize. Thus, a smooth operation is realized. Apart from the above, this embodiment is the same as that shown in FIG. 16.

In comparison to the conventional apparatus, the powder feeding apparatus of the present invention is smaller and has a far more simplified structure. Further, it can be installed more easily. Thus, it requires substantially no adjustment work, and the apparatus characteristics do not depend upon the installation conditions, etc., thereby providing characteristics which are relatively free from variations. This is particularly expedient when operating a number of feeding apparatuses in parallel. In addition to the advantage of the low price of the apparatus itself, the installation, adjustment and maintenance costs can be substantially reduced.

Further, when feeding powder with a carrier gas, it is possible to accurately control the powder feed amount to a desired value and, at the same time, the fluctuations in the amount of carrier gas can be reduced to a much lower level than in the prior art. If necessary, it is also possible to accurately maintain the amount of carrier gas at a predetermined value.

Thus, when applied to the powder coating material feeding apparatus of an electrostatic powder coating apparatus, the powder feeding apparatus of the present invention makes it always possible to accurately keep the coating material discharge amount of the electrostatic powder coating gun constant and, at the same time, to always maintain the optimum rate of ejection and the optimum dispersion condition, i.e., discharge pattern, of the coating material being discharged, whereby it is possible to obtain a high level of coating efficiency and a film thickness distribution which is always stable, thereby providing a high performance electrostatic powder coating apparatus which realizes a substantial reduction in coating material cost and a high level of product quality.

The electrostatic powder coating apparatus of the present invention has a simple structure, and includes very few sections where coating material is allowed to deposit, so that it is possible to clean the interior of the apparatus in a short time without having to disassemble the apparatus. Since the gas which has been used for the cleaning, which contains some coating material, is prevented from being scattered to the outside, it is possible to avoid contamination of the inner walls of the booth. Further, since the apparatus is provided with a means for cleaning the electrostatic powder coating gun and those portions of the apparatus which are connected to the tank of the powder coating material feeding apparatus, it is possible for the apparatus to execute material color change in a very short time, thereby achieving an improvement in terms of effective operating efficiency.

The powder feed amount measuring apparatus of the present has a very simple structure, and is inexpensive. Further, it enables the mass flow rate of a powder material to be measured without requiring any maintenance or inspection during operation, so that when used as a powder feed amount checking means for various powder feeding means, the apparatus makes it possible to obtain remarkable effects, such as improving the reliability of such feeding means and a saving in labor due to the termination of checking operations.

What is claimed is:

1. A powder feeding apparatus in which powder is fed through a large-diameter powder/feeding duct by a carrier gas supply means, said powder feeding apparatus comprising:

a means for adjusting a portion of a carrier gas to a fixed flow rate and supplying said portion as a powder flow rate detection gas;

a sensor nozzle which is provided on the downstream side of said means and through which said powder flow rate detection gas flows out;

a powder flow rate measuring capillary which is provided on the downstream side of and in close proximity to said sensor nozzle, which has an inlet and an outlet, and which has a diameter that is smaller than that of said large-diameter powder feeding duct;

pressure difference measuring means which are connected to said inlet and said outlet through filter means for the purpose of measuring a pressure difference between the inlet and the outlet of said capillary and which constitute a blind pipe route having an invariant interior volumes during normal operation;

a means for introducing powder to the inlet of said powder flow rate measuring capillary;

a large-diameter powder feeding duct connected to the downstream side of said capillary; and a means for adjusting the pressure difference between the inlet and the outlet of said powder flow rate measuring capillary.

2. A powder feeding apparatus according to claim 1, wherein the interior of said powder flow rate measuring capillary 1a is formed of a non-adhesive material 1a, such as a fluororesin or a high-density polyethylene.

3. A powder feeding apparatus according to claim 2, wherein the interior of said powder flow rate measuring capillary is conductive.

4. A powder feeding apparatus according to claim 1, wherein said powder flow rate measuring capillary is replaceable.

5. A powder feeding apparatus according to claim 1, wherein said filter means are formed of a non-adhesive, continuous porous film material, such as a fluororesin.

6. A powder feeding apparatus according to claim 1, wherein said filter means are conductive.

7. A powder feeding apparatus according to claim 1, wherein said filter means have a powder removing means.

8. A powder feeding apparatus according to claim 1, wherein the means for adjusting the pressure difference between the inlet and the outlet of said powder flow rate measuring capillary is an injector connected to said large-diameter powder feeding duct.

9. A powder feeding apparatus according to claim 1, wherein the means for adjusting the pressure difference between the inlet and the outlet of said powder flow rate measuring capillary is an injector having a drive gas flow rate controlling means.

10. A powder feeding apparatus according to claim 1, wherein the means for adjusting the pressure difference between the inlet and the outlet of said powder flow rate measuring capillary is an injector having a means for introducing a degree-of-vacuum adjusting gas into a vacuum chamber.

11. A powder feeding apparatus according to claim 1, wherein the means for adjusting the pressure difference between the inlet and the outlet of said powder flow rate measuring capillary is an injector whose principal parts coming into contact with powder, such as a throat pipe, are formed of a non-adhesive material, such as a fluororesin or a high-density polyethylene.

12. A powder feeding apparatus according to claim 11, wherein the means for adjusting the pressure difference between the inlet and the outlet of said powder flow rate measuring capillary is an injector whose principal parts coming into contact with powder, such as a throat pipe, are conductive.

13. A powder feeding apparatus according to claim 1, further comprising a means for introducing a powder feeding rate adjusting gas to said large-diameter powder feeding duct.

14. A powder feeding apparatus according to claim 1, wherein the principal parts of said large-diameter powder feeding duct coming into contact with powder are formed of a non-adhesive material, such as a fluororesin or a high-density polyethylene.

15. A powder feeding apparatus according to claim 14, wherein the principal parts of said large-diameter powder feeding duct coming into contact with powder are conductive.

16. A powder feeding apparatus according to claim 13, wherein said means for introducing a powder feeding rate adjusting gas to said large-diameter powder feeding duct includes a means for displaying the flow rate of said gas.

17. A powder feeding apparatus according to claim 1, wherein said means for introducing powder to the inlet of said powder flow rate measuring capillary consists of a powder tank and a powder introducing passage.

18. A powder feeding apparatus according to claim 1, wherein said means for introducing powder to the inlet of said powder flow rate measuring capillary consists of a partial fluidization layer formed in the vicinity of the inlet of said powder flow rate measuring capillary.

19. A powder feeding apparatus according to claim 1, wherein said means for introducing powder to the inlet of said powder flow rate measuring capillary consists of a powder container equipped with an agitator, and a powder introducing passage.

20. A powder feeding apparatus according to claim 1, wherein said means for introducing powder to the inlet of said powder flow rate measuring capillary consists of a vibration powder feeder communicating solely with the powder container and the inlet of said powder flow rate measuring capillary.

21. A powder feeding apparatus according to claim 1, wherein said means for introducing powder to the inlet of said powder flow rate measuring capillary consists of a means for mixing powder with a known amount of fluid.

22. A powder feeding apparatus according to claim 1, wherein said means for measuring the pressure difference between the inlet and the outlet of said capillary includes a means for adjusting the inclination characteristics and intercept characteristics of an output signal thereof.

23. A powder feeding apparatus according to claim 22, wherein said means for measuring the pressure difference between the inlet and the outlet of said capillary includes a device for displaying and storing the output signal thereof.

24. A powder feeding apparatus according to claim 1, wherein said means for measuring the pressure difference between the inlet and the outlet of said capillary includes an automatic control means to which an output signal thereof is input and which amplifies the difference between the output signal and a set value set by a setting means and outputs this difference, which is then supplied through automatic feedback control to said means for measuring the pressure difference between the inlet and the outlet of said capillary.

25. A powder feeding apparatus according to claim 1, wherein said carrier gas supply means includes an automatic flow rate control means having a carrier gas flow rate setting means.

26. A powder feeding apparatus according to claim 25, wherein said carrier gas supply means includes an automatic flow rate control means having a carrier gas flow rate setting means, and wherein a throttle is provided in a feeding rate adjusting gas introducing means connected to the downstream side thereof.

27. A powder feeding apparatus according to claim 17, wherein said large-diameter powder feeding duct, said powder flow rate measuring capillary, and said means for introducing powder to the inlet of said powder flow rate measuring capillary are detachable with respect to the powder introducing passage and the powder tank.

28. A powder feeding apparatus according to claim 13, wherein said large-diameter powder feeding duct has at its ends or somewhere between them a gas sucking means for removing powder remaining inside this large-diameter duct.

29. In combination, an electrostatic powder coating apparatus and a powder feeding apparatus in which powder is fed through a large-diameter powder feeding duct by a carder gas supply means, said powder feeding apparatus comprising:

a means for adjusting a portion of a carrier gas to a fixed flow rate and supplying said portion as a powder flow rate detection gas;

a sensor nozzle which is provided on the downstream side of said means and through which said powder flow rate detection gas flows out;

a powder flow rate measuring capillary which is provided on the downstream side of and in close proximity to said sensor nozzle which has an inlet and an outlet, and which has a diameter that is smaller than that of said large-diameter powder feeding duct;

pressure difference measuring means which are connected to said inlet and said outlet through filter means for the purpose of measuring a pressure difference between the inlet and the outlet of said capillary and which constitute a blind pipe route having invariant interior volumes during normal operation;

a means for introducing powder to the inlet of said powder flow rate measuring capillary;

a large-diameter powder feeding duct connected to said capillary;

a feeding rate adjusting gas supply means connected to said large-diameter powder feeding duct;

a means for adjusting the pressure difference between the inlet and the outlet of said powder flow rate measuring capillary; and an electrostatic powder coating gun system connected to said large-diameter powder feeding duct of said powder feeding apparatus, said electrostatic powder coating gun system including a means for charging powder, a means for electrically driving powder toward an object to be coated, and a means for spraying powder.

30. An electrostatic powder coating apparatus according to claim 29, wherein said means for charging powder is based on contact electrification.

31. An electrostatic powder coating apparatus according to claim 29, wherein said means for charging powder is based on contact electrification, and wherein said means for electrically driving powder toward the object to be coated consists of a space-charge electric field formed between the charged powder and the object to be coated.

32. An electrostatic powder coating apparatus according to claim 29, wherein said means for charging powder is based on contact electrification, and wherein said means for electrically driving powder toward the object to be coated mainly consists of an electrode which is provided at the tip of the gun and to which a high voltage is applied, and a power source for the electrode.

33. An electrostatic powder coating apparatus according to claim 29, wherein said means for charging powder consists of a pair of corona discharge electrodes contained in the gun, and wherein said means for electrically driving powder toward the object to be coated consists of a space-charge electric field formed between the charged powder and the object to be coated.

34. An electrostatic powder coating apparatus according to claim 29, wherein said means for charging powder consists of a pair of corona discharge electrodes contained in the gun and a power source for these electrodes, and wherein said means for electrically driving powder toward the object to be coated mainly consists of an electrode provided at the tip of the gun and a power source for applying a high voltage to said electrode.

35. An electrostatic powder coating apparatus according to claim 29, wherein said means for charging powder consists of a corona discharge electrode provided near the tip of the gun and a power source for the electrode, and wherein said means for electrically driving powder toward the object to be coated consists of a space-charge electric field formed between the charged powder and the object to be coated.

36. An electrostatic powder coating apparatus according to claim 29, wherein said means for charging powder consists of a corona discharge electrode provided near the tip of the gun and a power source for the electrode, and wherein said means for electrically driving powder toward the object to be coated mainly consists of an electric field formed between said corona discharge electrode and the object to be coated.

37. An electrostatic powder coating apparatus according to claim 29, wherein said means for charging powder consists of a corona discharge electrode provided near the tip of the gun, an opposite electrode provided on the outer side of the gun, and a power source for retaining these electrodes at a predetermined potential, and wherein said means for electrically driving powder toward the object to be coated mainly consists of a space-charge electric field formed between the charged powder and the object to be coated or an electric field formed between the corona discharge electrode and the object to be coated, or both of these electric fields.

38. An electrostatic powder coating apparatus according to claim 29, wherein said means for spraying powder consists of a hydrodynamic means provided near the tip of the gun, such as a diffuser, a revolving flow, a slit, diversion, or collision, or a composite means based on these means, and an adjusting means combined therewith.

39. A powder flow rate measuring apparatus comprising: a powder flow rate measuring capillary having an inlet and an outlet; a nozzle through which only a powder flow rate detection gas is blown into the inlet of said capillary; a means for controlling the flow rate of the powder flow rate detection gas supplied to said nozzle; a means for introducing powder to the inlet of said capillary; and a pressure difference measuring means consisting of a blind pipe route connected to said inlet and said outlet through filter means for the purpose of measuring a pressure difference between the inlet and the outlet of said capillary.

40. A powder flow rate measuring apparatus according to claim 39, wherein the interior of said powder flow rate measuring capillary is formed of a non-adhesive material, such as a fluororesin or a high-density polyethylene.

41. A powder flow rate measuring apparatus according to claim 40, wherein the interior of said powder flow rate measuring capillary is conductive.

42. A powder flow rate measuring apparatus according to claim 39, wherein said powder flow rate measuring capillary is replaceable.

43. A powder flow rate measuring apparatus according to claim 39, wherein said filter means are formed of a non-adhesive, continuous porous film material, such as a fluororesin.

44. A powder flow rate measuring apparatus according to claim 39, wherein said filter means are conductive.

45. A powder flow rate measuring apparatus according to claim 43, wherein said filter means include a powder removing means.

46. A powder flow rate measuring apparatus according to claim 39, wherein said means for introducing powder to the inlet of said powder flow rate measuring capillary communicates solely with the inlet of said powder flow rate measuring capillary.

47. A powder flow rate measuring apparatus according to claim 39, 40 and 46, wherein said means for introducing powder to the inlet of said powder flow rate measuring capillary has a means for adjusting the amount of powder introduced.

48. A powder feeding apparatus, comprising a sensor nozzle equipped with a flow rate control;

a powder introducing passage;

a high pressure duct, wherein an end of said sensor nozzle, an end of said powder introducing passage, and a base end of said high-pressure duct communicate with an inlet of a measurement capillary respectively;

a large-diameter powder feeding duct whose diameter is larger than that of said measurement capillary which communicates with an outlet of said measurement capillary;

a low-pressure duct having a base end which communicates with an outlet of said measurement capillary;

a pressure differential detecting device which communicates with a tip of said high-pressure duct, and a tip of said low-pressure duct respectively, said pressure differential detecting device comprising a pressure sensing member with a high-pressure chamber and a low-pressure chamber on either side of said pressure sensing member, wherein said high-pressure duct, said low-pressure duct, said pressure sensing member, and said high-pressure chamber and said low-pressure chamber form a pressure differential detecting module.

49. A powder feeding apparatus according to claim 17, wherein a powder feeding shaft including said sensor nozzle, said powder flow rate measuring capillary, and said filter means for measuring the pressure difference between the inlet and outlet of said capillary is vertically set in the powder tank.

50. A powder feeding apparatus according to claim 49, wherein said powder feeding shaft and the powder tank can be vertically separated from each other.

51. A powder feeding apparatus according to claim 49 and 50, further comprising a means for cleaning the exterior of said powder feeding shaft.

52. An electrostatic powder coating apparatus according to claim 29 in which powder is fed by a carrier gas supply means through a large-diameter powder feeding duct, wherein a powder feeding shaft including said sensor nozzle, said powder flow rate measuring capillary, said filter means for measuring the pressure difference between the inlet and outlet of said capillary, said injector, and said large-diameter powder feeding duct, is vertically set in the powder layer.

* * * * *

UNITED STATES PATENT AND TRADEMARK OFFICE
CERTIFICATE OF CORRECTION

PATENT NO. : 5,487,624
DATED : January 30, 1996
INVENTOR(S) : Hiromichi Toyota, et al It is certified that error appears in the above-indentified patent and that said Letters Patent is hereby corrected as shown below:

On the title page, item [30], should read --Feb. 22, 1993 [JP] Japan ... HE15-032291--;

Column 15, Line 66: Delete "of";
Column 26, Line 40: Delete "/" and insert one space therefor;
Column 27, Line  3: Delete "1a" both occurrences;
Column 30, Line 59: Delete "40 and 46,"; and
Column 32, Lines 6-7: Delete "and 50".

Signed and Sealed this

Twenty-eighth Day of May, 1996

Attest:

BRUCE LEHMAN

*Attesting Officer*   *Commissioner of Patents and Trademarks*